(12) United States Patent
Werb et al.

(10) Patent No.: US 6,456,239 B1
(45) Date of Patent: Sep. 24, 2002

(54) METHOD AND APPARATUS FOR LOCATING MOBILE TAGS

(75) Inventors: Jay Werb, Newton; Emin Martinian, Medford, both of MA (US); Melanie Swiderek, Manchester, NH (US); Samuel Levy, Newton; Peter Stein, Brookline, both of MA (US)

(73) Assignee: RF Technologies, Inc., Milwaukee, WI (US)

( * ) Notice: Subject to any disclaimer, the term of this patent is extended or adjusted under 35 U.S.C. 154(b) by 0 days.

(21) Appl. No.: 09/645,280

(22) Filed: Aug. 24, 2000

Related U.S. Application Data

(60) Provisional application No. 60/150,575, filed on Aug. 25, 1999.

(51) Int. Cl.[7] .............................. G01S 3/02; G06F 17/60
(52) U.S. Cl. ........................ 342/463; 342/452; 705/28; 235/385; 706/18
(58) Field of Search ................................ 342/450, 451, 342/452, 457, 458, 463, 465, 453; 235/385; 705/28; 706/24, 18; 455/456

(56) References Cited

U.S. PATENT DOCUMENTS

| | | |
|---|---|---|
| 4,658,357 A | 4/1987 | Carroll et al. |
| 4,711,994 A | 12/1987 | Greenberg |
| 4,827,395 A | 5/1989 | Anders et al. |
| 5,774,876 A | 6/1998 | Woolley et al. |
| 5,892,441 A | 4/1999 | Woolley et al. |
| 5,959,275 A | 9/1999 | Hughes et al. |
| 6,026,304 A | 2/2000 | Hilsenrath et al. |
| 6,046,683 A | 4/2000 | Pidwerbetsky et al. |
| 6,064,339 A | 5/2000 | Wax et al. |
| 6,104,344 A | 8/2000 | Wax et al. |
| 6,108,557 A | 8/2000 | Wax et al. |
| 6,112,095 A | 8/2000 | Wax et al. |
| 6,154,657 A * | 11/2000 | Grubeck et al. ............ 455/456 |
| 6,282,426 B1 * | 8/2001 | Wang ........................ 455/456 |

FOREIGN PATENT DOCUMENTS

| | | |
|---|---|---|
| EP | 0 245 555 A | 11/1987 |
| WO | WO 94 19781 A | 9/1994 |
| WO | WO 99 67737 A | 12/1999 |

\* cited by examiner

*Primary Examiner*—Thomas H. Tarcza
*Assistant Examiner*—Fred H. Mull
(74) *Attorney, Agent, or Firm*—Wolf Greenfield & Sacks PC

(57) ABSTRACT

A method and apparatus for determining tag location is disclosed. Tag reference data may be stored, e.g., in the form of a lookup table, as a trained neural network, and so on, and used to determine the location of tags. Readings used to determine tag location and/or preliminary tag locations may be filtered to produce reliable tag location indications. Packages of user configurable parameters can be provided and used for the filtering of the preliminary tag locations. Confidence levels may also be generated for determined tag locations and used, for example, to indicate how well an asset location system can distinguish between different tag locations.

46 Claims, 11 Drawing Sheets

FIG. 1
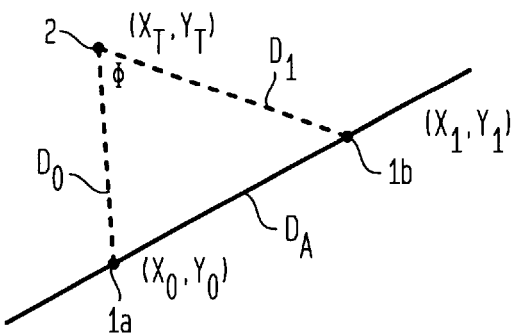
FIG. 2
FIG. 3
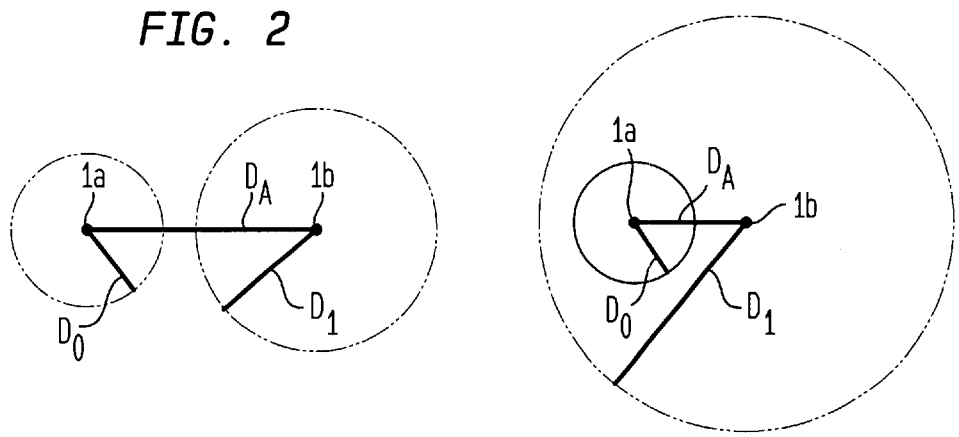
FIG. 4
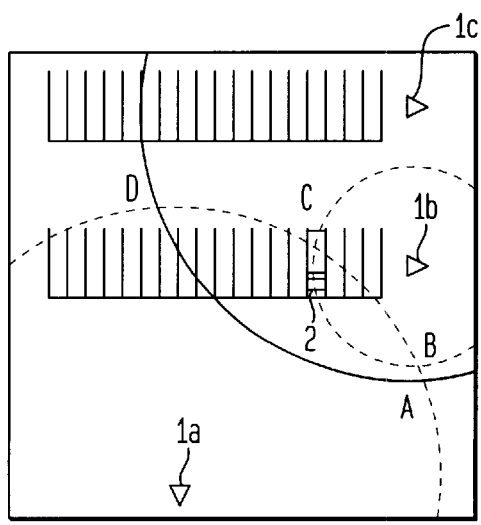

METHOD AND APPARATUS FOR LOCATING MOBILE TAGS

RELATED APPLICATIONS

This application is related to and claims the benefit under 35 USC §119(e) of the filing date of U.S. Provisional Application No. 60/150,575, filed Aug. 25, 1999, which is hereby incorporated by reference in its entirety.

FIELD OF THE INVENTION

The invention relates to determining the location of mobile assets associated with a tag.

BACKGROUND OF THE INVENTION

Determining the location of assets, such as personnel, equipment, vehicles, inventory, etc., can be important in a variety of different applications. For example, a company may wish to sound an alarm when a piece of equipment, such as a computer, is moved from one location to another, or when a person moves within a potentially dangerous area of a facility. One way to track the location of assets is to associate each asset, or group of assets, with a tag. The tag may be capable of communicating with a controller through one or more receivers to provide information used to determine the location of the tag, and thus the location of the associated asset. As one example, the tag may send a radio frequency signal that is received by one or more antennas that communicate with a controller. Based on the signal, the controller may determine where the tag is located.

A variety of methods may be used by the controller to determine the location of the tag. For example, the controller may receive a signal output by a tag at two antennas and use the signals received by each antenna to locate the tag using triangulation. However, triangulation may not be useful in situations where a signal from a tag can not be received at more than one antenna. In such cases, triangulation alone may not be used to determine the location of the tag. In addition, in some cases, a signal output by a tag may be properly received at two receivers, allowing a proper determination of the location of the tag, but improperly received at a third receiver. In such a case, inclusion of the information related to the signal received at the third receiver in the triangulation determination may prevent or confuse the process of properly identifying the location of the tag.

SUMMARY OF THE INVENTION

The present invention provides a system for determining a location of a tag. In an illustrative embodiment, at least one device is provided to communicate with a tag, e.g., the device may receive a signal sent by the tag. Information regarding communication with a reference tag is stored, processed, and/or analyzed to determine a location of a tag. As one example, information regarding the communication with the reference tag may be stored in a lookup table and used to determine the location of other tags.

In an illustrative embodiment, an asset location system is provided including at least one receiver that receives a signal from a tag, a controller that communicates with the at least one receiver, and a memory that stores data regarding previous communication between at least one receiver and a reference tag while the reference tag is in at least two different locations. The controller may determine a location of the tag based on the stored information regarding communications with the reference tag.

In another illustrative embodiment, a method for locating a tag is provided. One or more signals representing a communication with a reference tag while the reference tag is in at least two locations is received and stored. A location of a tracking tag is determined based on the stored information regarding communications with the reference tag.

In another illustrative embodiment, a method of determining a location of a tag is provided. At least one device to communicate with a tag is provided and a signal representing communication with the tag is received. A preliminary location for the tag is determined based on the signal, and the preliminary location is filtered before being used to report the tag location.

According to another illustrative embodiment, a method for developing a system for determining a location of a tag is provided. A reference tag is positioned in at least one zone, and data representing a distance from the reference tag to at least one reference point is obtained while the reference tag is in the zone. An algorithm for determining a location of a tracking tag is determined based on the obtained data.

In another illustrative embodiment, a storage medium including a set of instructions to be executed by a data processing apparatus is provided. The set of instructions includes instructions to receive a plurality of signals representing a location of a reference tag with respect to at least one reference point, instructions to analyze the plurality of signals for patterns regarding locations of the reference tag with respect to the at least one reference point, and instructions to provide a representation of the analysis of the signals to a user.

In another illustrative embodiment, a method for determining a location of a tag is provided. A tag is communicated with at at least two different receiver locations, and tag-receiver distances between the tag and the two receiver locations are determined. The location of the tag is determined based on the two tag-receiver distances.

The invention encompasses the features hereinafter fully described and particularly pointed out in the claims. The following description and the appended drawings set forth in detail certain illustrative embodiments of the invention. However, these embodiments are indicative of but a few of the numerous ways in which the principles of the invention may be employed. Other objects, advantages, and novel features of the invention will become evident from the following detailed description of the invention when considered in conjunction with the drawings.

BRIEF DESCRIPTION OF THE DRAWINGS

The invention is described with reference to the following drawings, in which similar reference numbers indicate similar structures.

FIG. 1 is a schematic diagram of a portion of an asset location system;

FIGS. 2 and 3 are schematic diagrams representing situations where an erroneous distance reading has been obtained;

FIG. 4 is a schematic diagram of a portion of an asset location system in which an erroneous antenna reading has been obtained;

DETAILED DESCRIPTION

Figure 5:
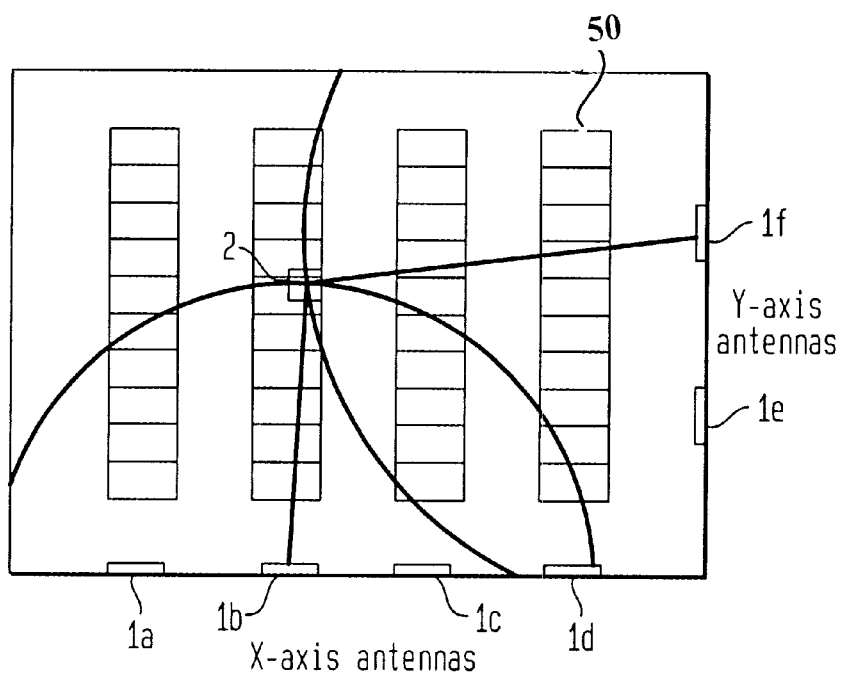
FIG. 5. is a schematic diagram of a configuration in which a tagged asset is to be located in rows of assets.

As discussed briefly above, tags of various kinds are currently used to track the location of one or more assets associated with the tag. The tags may have a variety of different configurations, which may depend on the application. For example, the tags may be radio frequency identification tags (RFID tags) that communicate with one or more receivers, e.g., antennas. A controller linked to the receivers may determine the location of the RFID tags based on the communications between the receivers and the tags. However, RFID tags are not the only type of tags that may be used to track assets. For example, tags may communicate using other signals, such as electromagnetic signals outside of the radio frequency band, ultrasonic signals, combinations of electromagnetic and ultrasonic signals, and so on. In addition, communication between the tags and a receiver may be one-way or two-way communications, and the tags may be active (include an internal power source) or passive (include no internal power source and be powered by an external source, such as an interrogation signal). The communications between the tags and receivers may include a variety of different types of information or may be used in a variety of different ways to determine the location of a tag. For example, the communications may be used to determine a difference in the time of arrival of a signal from the tag at two or more receivers, a round trip time of flight of a signal between a receiver and the tag, a time of arrival of a signal at a receiver, a direction from which the signal was sent, or a strength of a signal received at a receiver. As another example, the fact that a signal sent by a tag was received may provide information useful for determining the tag's location, e.g., receiver sensitivity to a signal sent from the tag may be varied, thereby indicating an approximate distance between the receiver and the tag. Such information may then be used to determine the location of the tag, as is well known in the art and not described in detail herein.

Several illustrative embodiments of the invention are described below, and generally relate to RFID tags and determining tag location using a distance between the tag and a receiver, i.e., a tag antenna distance (TAD). In some of these illustrative embodiments, the TAD is determined based on a round trip time of flight of a signal between an antenna and a tag. However, it should be understood that the various aspects of the invention are not limited to such a configuration. Instead, various aspects of the invention may be used in other types of asset location systems, such as those that communicate using ultrasonic signals, that determine a tag antenna distance not based on a round trip time of flight of a signal, or that do not use a tag antenna distance to determine tag location.

One method for locating tagged assets is triangulation. This method may involve using signals received at two or more locations, e.g., signals received by two or more antennas, to locate the position of a tag. The distance from each antenna to the tag may be determined, and a geometric solution for the tag location can be produced. Alternately, a direction from which the tag signal was received at each antenna location, and/or a combination of direction and distance may be used to determine the tag location. In the illustrative embodiments described below, Tag-Antenna Distance (TAD) information is determined based on signals received from a tag at each antenna. Thus, a signal received at an antenna from a tag may be used to determine the distance between the antenna and the tag. This distance may be determined in any of a number of suitable ways, as are well known in the art. One such way is to determine the TAD information, or distance reading, based on round trip time of flight of a signal traveling from an antenna to the tag and a signal traveling from the tag to the antenna.

In a simple example shown in FIG. 1 using distance measurements for triangulation, a configuration with two antennas $1a$ and $1b$ at known positions $(X_0, Y_0)$ and $(X_1, Y_1)$ are at distances $D_0$ and $D_1$ from the tag 2. This information may be used to determine the tag location $(X_T, Y_T)$. Conceptually, the solution may proceed in two steps. First, the configuration may be reoriented so that it can be placed within a simple coordinate system with the antenna $1a$ at the origin and the antenna $1b$ on the X-axis. This allows the triangulation calculations to be performed using simple geometry. Once the basic calculations are performed, the result may be rotated and translated back to the original orientation.

The difference between the two antenna $1a$ and $1b$ positions along the X and Y axis may be defined as in Equations 1 and 2:

$$\Delta X_A = X_1 - X_0 \quad (1)$$

$$\Delta Y_A = Y_1 - Y_0 \quad (2)$$

The distance $D_A$ between two antennas $1a$ and $1b$ may be defined as in Equation 3:

$$D_A = \sqrt{\Delta X_A^2 + \Delta Y_A^2} \quad (3)$$

Next, $(X_U, Y_U)$ may be determined, which is the position of the tag 2 relative to our simple coordinate system (that is, prior to rotating and translating it back to its original orientation) as shown in Equations 4 and 5:

$$X_U = \frac{D_0^2 - D_1^2 + D_A^2}{2 D_A} \quad (4)$$

$$\pm Y_U = \sqrt{D_0^2 - X_U^2} \quad (5)$$

Finally, the result may be rotated and translated back to the original orientation, giving two possible solutions for the location of the tag 2 as shown in Equations 6 and 7:

$$X_{T1} = X_1 + \frac{X_U \Delta X_A - Y_U \Delta Y_A}{D_A} \quad Y_{T1} = Y_1 + \frac{X_U \Delta Y_A + Y_U \Delta X_A}{D_A} \quad (6)$$

$$X_{T2} = X_1 + \frac{X_U \Delta X_A + Y_U \Delta Y_A}{D_A} \quad Y_{T2} = Y_1 + \frac{X_U \Delta Y_A - Y_U \Delta X_A}{D_A} \quad (7)$$

Inconsistent distance readings, i.e., TAD information, from one or more antennas may present difficulties when using triangulation. FIGS. 2 and 3 show two examples where inconsistent distance readings have been obtained. The antenna 1a detects a signal that results in a determination of the distance $D_0$, and the antenna 1b detects a signal that results in a determination of the distance $D_1$. In FIGS. 2 and 3, there is no intersection of the circles defining the possible locations of the tag 2. In FIG. 2, the circle defined by the radius $D_0$ is outside of the circle defined by the radius $D_1$, whereas in FIG. 3, the circle defined by the radius $D_0$ is inside of the circle defined by the radius $D_1$. Such cases may be handled differently to prevent the calculation of $Y_U$ resulting in the square root of a negative number. Equations 8 and 9 may be used to calculate $X_U$ and $Y_U$ in these cases:

Fig. 2: $\quad X_U = \dfrac{D_A - (D_0 + D_1)}{2} + D_0 \quad Y_U = 0 \quad$ (8)

Fig. 3: $\quad X_U = \dfrac{D_0 + D_A - D_1}{2} - D_0 \quad Y_U = 0 \quad$ (9)

Another consideration that may be important to consider is the geometry of a configuration because, in certain configurations, small errors in distance measurement between an antenna and a tag may result in large errors in the estimated tag location. (An estimated tag location may represent, at least in some cases, an exact location of a tag 2, and in other cases an approximate location of the tag 2 since there is typically some limit to the accuracy of an asset location system, e.g., the system may accurately locate a tag to within 3 feet. However, no distinction is made herein between "estimated tag locations" and "tag locations" determined by an asset location system. That is, "estimated tag locations" and "tag locations" determined by a location system refer to the same determination as used herein. In addition, tag locations may refer to absolute tag positions, e.g., coordinate positions, or general tag positions, e.g., a zone within which a tag is located.) For example, assume that two antennas 1a and 1b lie along the X-axis. If a tag 2 is between those two antennas 1a and 1b, accuracy on the Y-axis is poor. If the tag 2 is very far away from the X-axis, accuracy on the X-axis is poor. The angle between the tag 2 and the antennas 1a and 1b may be used to characterize this sort of geometric error. For example, in FIG. 1 angle $\phi$ may be used to estimate the potential error in determining the location of the tag 2. In general, it may be preferable for the angle $\phi$ to be as close as possible to a right angle, because such a configuration may result in only moderate error in two dimensions, rather than high error in one dimension. However, this depends to a certain degree on the needs of the user. At times, high resolution may be desired in one axis, but not the other. In this case, an angle $\phi$ much lesser (or greater) than 90° may produce more useful results. The angle $\phi$ may be determined using the Law of Cosines ($c^2 = a^2 + b^2 - 2ab \cos \phi$), which reduces to Equation (10) for the arrangement shown in FIG. 1.

$$\phi = \cos^{-1}\left[\dfrac{D_0^2 + D_1^2 - D_A^2}{2 D_0 D_1}\right] \quad (10)$$

The effect of geometric error, if any, on a determination of the tag 2 location may be calculated. For example, assume the configuration of FIG. 1 with both antennas 1a and 1b reoriented along the X-axis. Using this configuration, Equations 11–14 may be used to determine the effect of geometric error on the tag location estimate:

$$\dfrac{\partial T_x}{\partial D_0} = \dfrac{D_0}{D_A} \quad (11)$$

$$\dfrac{\partial T_y}{\partial D_0} = \dfrac{D_0}{D_A \tan B} \quad (12)$$

$$\dfrac{\partial T_x}{\partial D_1} = \dfrac{D_1}{D_A} \quad (13)$$

$$\dfrac{\partial T_y}{\partial D_1} = \dfrac{D_1}{D_A \tan A} \quad (14)$$

These Equations 11–14 show the effects on tag 2 location estimates as error changes the distance readings.

The sensitivity of a particular tag 2/antenna 1 configuration may also be determined in at least two ways. One way is to solve for the above Equations 11–14 and then rotate and translate the results back to the original orientation. Another way is to use actual values for distance readings between each antenna 1 and the tag 2 and calculate the effects of small errors in distance measurement on the final tag 2 location estimates.

Information about the angle $\phi$ may be used as a kind of filter on distance readings, e.g., determined distances between an antenna 1 and a tag 2. For example, suppose that there are more than two antennas 1 receiving readings from a tag 2. Some of these readings may be erroneous. If that is so, then using all possible pairs of antennas 1 for triangulation calculations may result in multiple location estimates that are not in agreement.

FIG. 4 shows a parking lot such as might be used for tractor-trailers delivering goods. In this configuration, three antennas 1a–1c are used to locate tagged trucks within the lot. FIG. 4 shows tag 2 distance estimates (dashed line circles) based on a distance reading from each antenna 1. In this example, a particular truck is to be located within the parking lot. Two of the antennas (1a and 1b) have produced accurate readings, and the third antenna 1c reading is inaccurate. As the figure illustrates, distance information received from the antennas 1a–1c have produced four different tag location estimates (A, B, C, D) where each of the distance estimates (dashed line circles) for each antenna 1a–1c intersect.

In situations like this, distance measurements that are obviously based on erroneous readings, that is, obvious outliers, may be eliminated. Points A and B may be eliminated because they are too far away from a parking space. Also, it may be expected that point C is more accurate than point D for three reasons:

Point C locates the truck within a parking space, while point D does not.

Errors tend to be long, rather than short. (A number of things can cause a system to obtain erroneously long readings from an antenna 1, including interior geometry, which sometimes requires that the message from a tag 2 take an indirect route to get to an antenna 1.) Thus, it is more likely that the antenna 1c is producing a long reading than the antenna 1b is producing a short reading.

Even if point D were within a parking space, the estimate is unlikely to remain stable over time. Erroneous readings may locate a tag within a parking spot once, but they are unlikely to locate the truck in that same parking spot repeatedly.

Once erroneous readings are eliminated, one way to determine which of the remaining distance estimates to use is to calculate the angle $\phi$ for each point still under consideration. We can then filter out estimates from pairs of antennas 1 that form an angle appreciably larger or smaller than 90°. In the case above, if choice was being made between points C and D, the angle for each of the two points may be calculated. If the angle for point C were appreciably closer to 90° than the angle for point D, we would choose point C.

In the description above, an assumption was made that the tag 2 and the antennas 1 were located in a same two-dimensional plane, but this is not always the case. In fact, antennas 1 are often located above a tag 2. This vertical distance can be compensated for by taking a known vertical distance V between the tag 2 and the antenna 1 and the TAD to determine the horizontal distance $D_{horizontal}$, e.g., $D_{horizontal}=(TAD^2=V^2)^{1/2}$. Once the distance $D_{horizontal}$ is determined, it may be used for the various two-dimensional calculations described. Even if there are small variations in the vertical location of the tag, this model works reasonably well as long as the vertical variations are small in comparison to V. This correction to the two-dimensional approximation assumes that the vertical distance between the antenna and tag is always V. If this vertical distance is actually V+δ, we can evaluate the accuracy of $D_{horizontal}$ using a Taylor series to expand the formula for $D_{horizontal}$ to first order in δ as shown below:

$$D_{horizontal}(V+\delta)=\sqrt{D_{measure}^2-(V+\delta)^2} \quad (15)$$

$$D_{horizontal}(V+\delta)=\sqrt{D_{measure}^2-V^2+2V\delta-\delta^2} \quad (16)$$

$$D_{horizontal}(V+\delta)=\sqrt{D_{measure}^2-V^2} \times \sqrt{1+\frac{(2V\delta-\delta^2)}{D_{measure}^2-V^2}} \quad (17)$$

$$D_{horizontal}(V+\delta) \sim \sqrt{D_{measure}^2-V^2} \times \left(1-\frac{V\delta}{D_{measure}^2-V^2}\right) \quad (18)$$

Note that in going from Equation (17) to (18) the expansion $$\sqrt{1+x} \sim 1+\frac{x}{2},$$

is used, which is valid for x<<1 and all terms with powers of δ>1 were ignored. Let ε be the error in ignoring δ in computing $D_{horizontal}$:

$$\epsilon=|D_{horizontal}(V+\delta)-D_{horizontal}(V)| \quad (19)$$

As long as $$\frac{V\delta}{D_{measure}^2-V^2} << 1,$$

, we have $$\varepsilon < \frac{V\delta}{\sqrt{D_{measure}^2-V^2}}.$$

. For example, if $D_{measure}^2>24$ and V<6, then $$\varepsilon < \frac{\delta}{\sqrt{15}}$$

as long as $$\frac{\delta}{90} << 1.$$

.

In addition to filtering, another way to compensate for the effects of geometry is to consider a solution depending on what is being located and where. For example, tagged assets may need to be located in a configuration that requires higher resolution in one dimension than in another. This would be the case, for instance, in an automated sorting facility. In such a facility, the setup may be somewhat like the parking lot example in FIG. 4. However, in this example shown in FIG. 5, the "spaces" in which a container 50 might be found may be smaller and closer together. In such a case, geometry may be compensated for by installing a larger number of antennas along one axis, e.g., the X-axis, in order to achieve higher resolution along a transverse axis, e.g., on the Y-axis.

Locating a tag 2 associated with a container 50 in the configuration shown in FIG. 5 may be done in two steps. First, triangulation may be used as described above. This narrows the location of the container 50 to a particular row. (In FIG. 5, location estimates have already been filtered and a pair of antennas, e.g., antennas 1b and 1f, with the most favorable geometry have been selected.) This gives a location, but with the effects of geometric error, the location may not be precise enough to determine the location of a particular container 50 in a row of closely spaced containers 50.

Next, an X-axis antenna with the best geometry, e.g., antenna 1b, is selected and used to measure tag-antenna distance in a single dimension, e.g., in a direction approximately parallel to the Y axis. This indicates where the container 50 is in that particular row. This is one example of how the effects of geometry can be compensated for through antenna placement.

Figure 6:
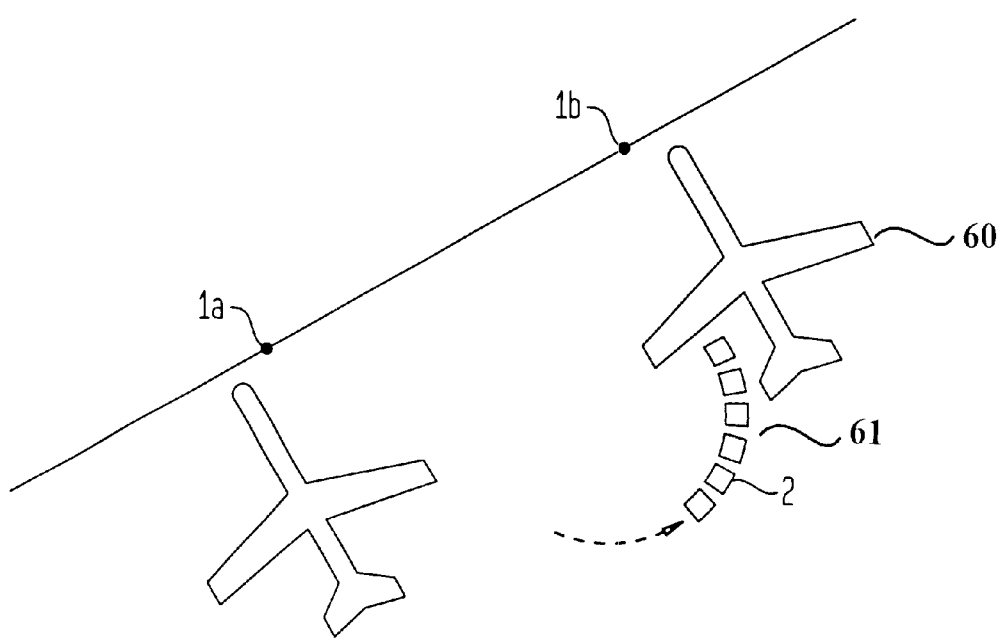
FIG. 6 is a schematic diagram of a configuration in which a tagged asset is to be located in a movable train of assets.

Another instance in which geometry may be compensated for is when the relative positions of groups of objects that roll around freely are to be determined, but the objects have a known relation to each other. An example of this involves container trains 61 being loaded and unloaded near aircraft 60, as shown in FIG. 6. In this example, a tagged object may need to be located somewhere on a container train 61 near an aircraft 60. The location of tagged objects on a container train 61 is somewhat complicated by the fact that the train 61 moves around the area near the aircraft 60. Thus, a fixed location for an object alone may not be determined. The solution of this problem may proceed in several steps.

First, the general orientation of the train 61 may be determined using triangulation as described above. This indicates where each container is relative to the tug at the front of the train 61. Then, the distance of a tagged object relative to the tug may be determined. In order to do this, a tag may need to be placed on each tug. The best antenna may be selected and (a) the distance from the antenna to the tug may be determined, and (b) the distance from the antenna to the tagged object may be determined. The difference between the two is the distance of the tagged object relative to the tug. This indicates where the tagged object is relative to the tug. Since the sizes and spacing of the containers on the train are known, the relative distance may be used to determine which container holds the tagged object. Triangulation may again be used to look for outliers, which would tend to be location estimates that do not coincide with a container. Since the train may stop multiple times while loading or unloading items near the aircraft, there may be multiple chances to locate an object on the train and to eliminate inconsistent data. This is another example of a situation in which compensation for the effects of geometry may be made. Additional reference may be made to "3D-iD Technical Overview," Billerica, Mass., PinPoint Corporation, 2000.

Tag locations may be determined using methods other than triangulation, e.g., in a way that does not necessarily determine, or attempt to determine, a precise location for the tag 2. For example, a system may communicate with a tag 2 using one or more antennas 1 in such a way that a zone, or area, within which the tag 2 is located may be determined. One such system is a Boolean rule-based system, in which a facility, or other region within which tags 2 may be located, is logically divided into zones. A zone may be a room, a portion of a hallway, a manufacturing station where a particular process occurs, or some other identifiable area. ViewPoint, a commercially available software application used with the 3D-iD system offered by PinPoint Corp., allows the creation of hierarchically organized zones. An example of a zone hierarchy is shown in FIG. 7.

Figure 7:
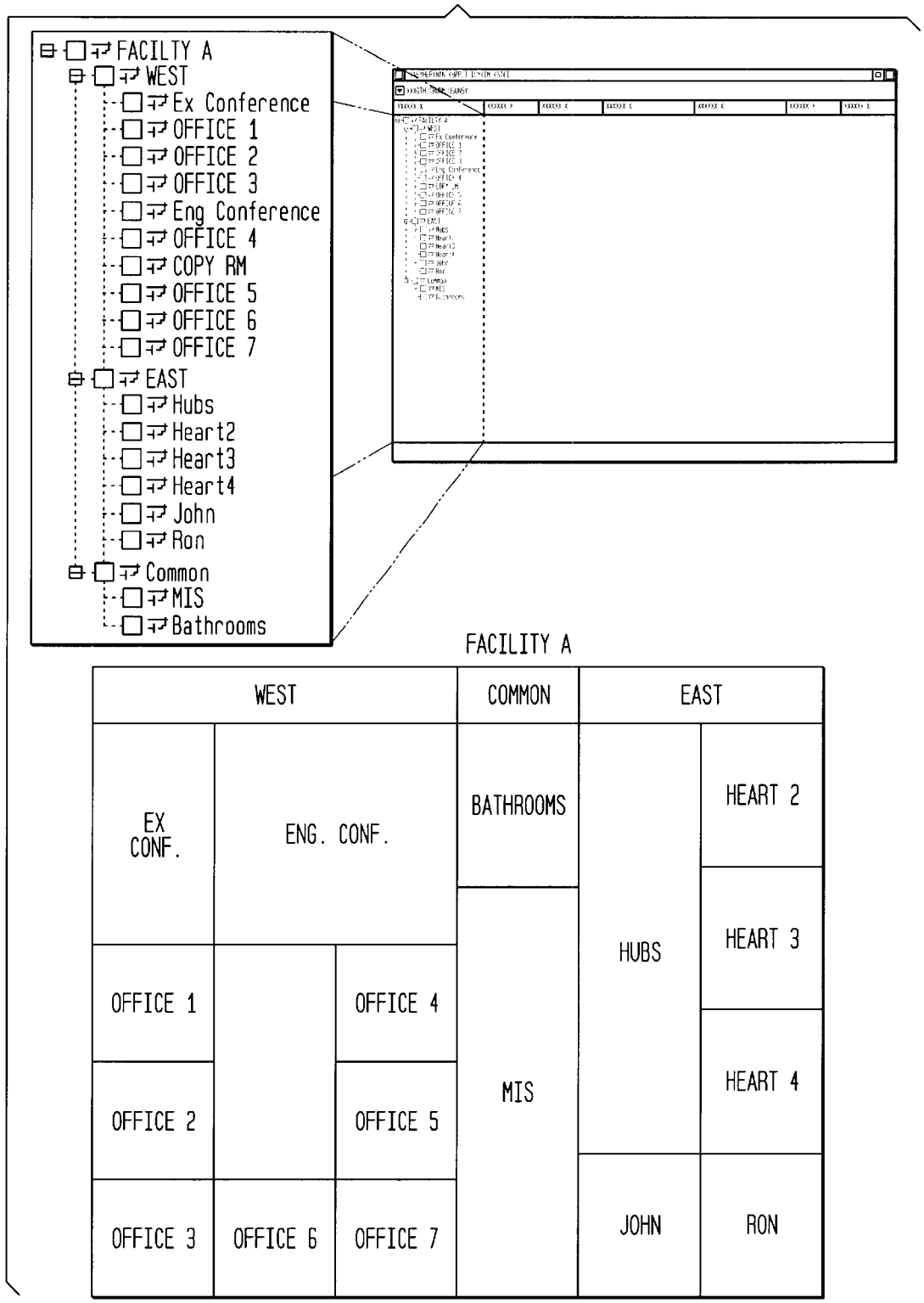
FIG. 7 is a schematic diagram of an illustrative zone layout and corresponding hierarchy for an asset location system.

As shown in FIG. 7, a facility may be divided into parent zones and child zones within a corresponding parent. In this example, the facility A is divided into three parent zones, East, West and Common. Each of these parent zones has corresponding child zones, such that if a tag is located within a child zone, the tag is necessarily located within the parent zone. Although the example in FIG. 7 shows only three hierarchical levels, a configuration may have fewer or more than three levels, if suitable.

Using a hierarchical structure for zones may be useful, for example, in Boolean rule-based systems. That is, rather than executing every rule in a system to determine the location of a tag, rules may be applied in a top-down manner so that parent rules are first applied to a set of antenna readings, followed by child rules. This approach may reduce the time needed to determine the location of a tag and provide a way to quickly provide a general indication of a tag's location, since not all rules in a system need be checked to locate the tag. For example, the rules for the three parent zones, West, East and Common, may first be applied to a set of antenna readings for a tag. If the antenna readings satisfy the rules for one of the zones, e.g., Common, then the rules for MIS and Bathroom may next be applied to locate the tag. Rules for child zones under the West and East zones need not be applied.

Boolean rule-based systems typically involve a human rule designer, who estimates and/or analyzes antenna readings received when a tag 2 is placed at different locations and orientations in the zones. The human rule designer then creates rules to map the antenna readings to zones. A location builder application within ViewPoint allows the rule designer to define Boolean rules that the system uses to convert Tag-Antenna Distance (TAD) data to information about the location of a tag 2. For example, a rule designer might create a statement that indicates that a tag 2 is in zone A if it is within 15 feet of antenna #1 on controller cc1 and more than 30 feet from antenna #4 on controller cc1. Another type of statement ("closest to") might indicate that a tag 2 is in zone D if it is closest to antenna #3 on controller cc1.

Locations may be set in the lowest level of the hierarchy, and higher-level ("parent") locations may have rule sets that are the sum of the rule sets of lower-level ("child") locations. However, it may be desirable under some circumstances to create a separate set of rules for parent locations. For example, a set of parent rules may indicate that an asset is on a floor of a multi-story building, with child rules indicating the suite. If there was not enough information to identify whether a tag 2 is currently located within a particular suite (child zone) based on the rules provided, the system may report that the tag 2 is somewhere on the floor (parent zone). A similar result could be obtained by including a child location at the end of a rules list, indicating that the tag 2 is within the parent and not in any of the other children.

It seems a relatively straightforward matter to create Boolean rules for use with this type of asset location system, and Boolean rule-based systems have several advantages over systems using triangulation:

In a space with obstructions, the accuracy of tag location estimates tends to improve with Boolean rule-based systems compared with triangulation.

It is relatively easy to understand Boolean rules and how they might be used to locate objects within clearly defined zones.

In some circumstances (such as in hospital settings, where rooms and hallways are clearly defined) information obtained by using zones, rather than triangulation, is potentially more useful.

Particularly in spaces with many obstructions, more antennas are needed for triangulation than for zone-based detection.

However, there are three main difficulties presented when a human rule designer creates Boolean rules for a system. First, a properly trained rule designer is needed on site to design the rule set. Training a rule designer can be difficult and time-consuming. Furthermore, experience suggests that rule design is more of an art than a science, which makes rigorously evaluating the utility of a rule set problematic. Another disadvantage of requiring a human rule designer is that even though the human brain is capable of remarkable things, it is ill suited to analyzing large amounts of data. Therefore, even a highly experienced rule designer tends to build rules based on single antennas 1, or simple combinations of two antennas 1.

One way to limit the need for human rule designers to analyze large amounts of information is to create software or other tools to assist in analyzing Tag-Antenna Distance (TAD) data, or other information used to determine tag location rules, before or during rule creation. One software program that does this is the ViewPoint TAD Analyzer application. This application takes data collected from different zones and organizes it into a format wherein patterns are easier to see. These data patterns can then guide users in writing Boolean rules that are more accurate.

Figure 8:
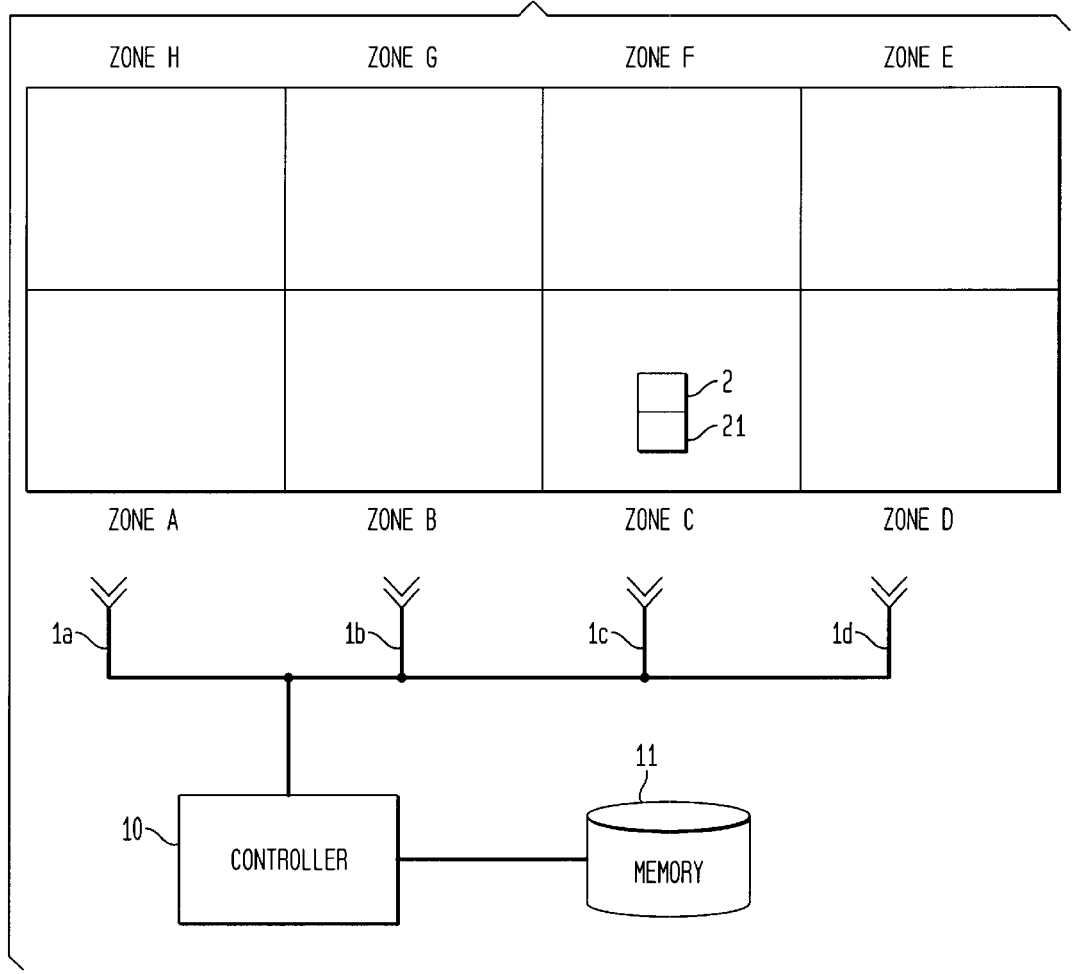
FIG. 8 is a schematic block diagram of an asset location system.

For example, a set of Boolean rules may be developed for an asset location system such as that shown in FIG. 8. In this illustrative embodiment, an area is divided into eight zones, Zones A through H. Four antennas $1a$–$1d$ communicate with a controller 10. The controller 10 receives signals from the antennas $1a$–$1d$ and may determine the location of the tag 2, possibly with reference to information, such as Boolean rules, stored in a memory 11. The controller 10 may be a general purpose computer, or network of computers, that is suitably programmed to perform the desired input/output and/or other functions. The controller 10 may also include any suitable components or devices, such as software modules, communication devices, memories, displays, user interface devices, etc. For example, the controller 10 may include a cell controller that receives signals from and sends signals to a plurality of antennas or other receiving/transceiving devices and a data processing apparatus that receives information from multiple cell controllers to determine tag location.

The antennas 1 may operate as receivers and/or transmitters in communicating with tags 2 or other devices. In addition, different numbers of antennas 1 may be used, and/or the antennas 1 may be replaced with any other suitable device depending upon the type of asset location system used. For example, tags 2 may communicate with the controller 10 using ultrasonic, electromagnetic or any other suitable signal. Thus, the antennas 1 may be replaced or supplemented with other devices, such as microphones, infrared transceivers, etc. Correspondingly, the controller 10 may determine a variety of different information from communication with a tag 2. For example, the controller 10 may determine a tag-antenna distance (TAD), a direction in which the tag 2 is located relative to a reference point (such as a receiver location), etc. Such determinations may be made based on a signal strength of the tag signal at one or more receivers, a time difference of arrival of a tag signal at two or more receivers, Doppler shift of a tag in motion, a round-trip time of flight for communication between a transmitter, receiver and a tag, and so on.

As part of the Boolean rule generation process, a service test application operating within the controller 10 (or another data processing apparatus (not shown) that communicates with the controller 10) is first used to collect reference data. For example, an individual may walk around each zone with a tag 2 for a brief period of time, and as the individual (and the tag 2) moves from zone to zone, or within a single zone, the tag 2 sends signals that may be used by the controller 10 (or other apparatus) to determine in which zone the tag 2 is located, e.g., the distance from the tag 2 to one or more antennas 1a–1d may be determined from signals sent to and/or from the tag 2. Concurrently, data regarding the actual location of the tag 2 at specific times, such as the actual zone that the tag 2 is located in for each communication, is also collected, e.g., by a personal digital assistant (PDA) or other suitable device. Alternately, the controller 10 may be instructed to collect data for the tag 2 while the tag 2 is moved within a specific zone, e.g., to collect data while the tag is in Zone A. The controller 10 may then be instructed to pause data collection while the tag 2 is moved from the current zone (Zone A) to another zone, and resume data collection when the tag 2 is in the new zone. The controller 10 may collect readings from the tag 2 and write them to a file, e.g., write distance readings and a corresponding actual zone for each reading in the memory 11. The TAD Analyzer application (operating on the controller 10 or other data processing apparatus) may then analyze the collected data to extract patterns. The application may produce a table for one or more zones that contains data similar to that contained in Table 1.

TABLE 1

| | Distance | | | | | | | | | | |
|---|---|---|---|---|---|---|---|---|---|---|---|
| Controller 10 (312) | 20 | 21 | 22 | 23 | 24 | 25 | 26 | 27 | 28 | 29 | 30 |
| Antenna #1a (141) | | | | | | | | | | 67 | 74 |
| Antenna #1b (144) | | | | | 75 | 69 | | | | | |
| Antenna #1c (9) | | | 2 | | | | 3 | | 4 | | |
| Antenna #1d (18) | | | | | | | 1 | 7 | 10 | | |

Table 1 shows an example of what output might look like from the TAD Analyzer application for a single zone. Table 1 indicates that the tag 2 was seen 312 times in this zone by controller 10. Antenna 1a saw the tag 141 times, Antenna 1b saw it 144 times, and so forth. Of the 141 readings by Antenna 1b, 67 were at distance 29 and 74 were at distance 30, and so on.

From this hypothetical data, the tag 2 was most often seen in this zone by antennas 1a and 1b. Moreover, antenna 1a always saw the tag at distance 29 or 30, while antenna 1b always saw the tag at distance 24 or 25. Using this pattern, Boolean rules may be written for locating the tag 2 within this zone. The rules might look like the following:

cc10.1a=29–30 & cc10.1b=24–25

In English, this rule reads:

"The tag is in this zone if it is between 29 and 30 feet from Antenna 1a on Controller 10 and between 24 and 25 feet from Antenna 1b on Controller 10."

This is a very simplistic example, but it illustrates how the TAD analyzer application or a similar application or device can assist human rule designers in creating more accurate rules for locating tags within zones.

For higher reliability, a TAD consolidation process or similar method or device may be used with the TAD analyzer or similar application. This process allows the system to manage a particular problem known as tag dropout. When a tag 2 is within a particular zone, there is typically a subset of antennas 1 that receives readings from that tag 2. Occasionally, however, an antenna 1 covering that zone does not receive a reading from that tag 2. This is known as tag dropout. Tag dropout may be a problem if the Boolean rules for a zone rely on readings from a particular antenna 1. For example, if our rule states that a tag 2 is in Zone C if it is closest to antenna 1c on controller 10, and no reading is received from antenna 1c, the TAD Consolidation process may provide a way to obtain a location estimate even when there is tag dropout.

The TAD consolidation process may examine a previous antenna reading and a current antenna reading for a tag and consolidate the data from the two readings according to certain rules. For example, suppose we see the readings:

Previous Reading: cc10.1a=6, cc10.1c=12, cc10.1d=25

Current Reading: cc10.1a=12, cc10.1b=40, cc10.1d=25

Suppose that the rule for this zone were written based on antenna 1c on controller 10. Using only the current reading, the system may not be able to estimate a location based on the current reading alone. However, the TAD consolidation process may provide, in part, that if at least one antenna 1 has a matching distance between a past and a current reading, the system should take the shortest distance for matching antennas 1 and simply add unique antenna readings. Following this rule, a consolidated reading may be:

Consolidated Reading: cc10.1a=6, cc10.1b=40, cc10.1c=12, cc10.1d=25

The system can apply the rule for this zone to the consolidated reading to obtain a location estimate for this tagged object. The TAD Consolidation process may include a number of rules for different situations. For example, different rules may be provided for when at least one antenna has a matching distance between two readings and when no antennas have matching reads.

The TAD consolidation process may operate over a window of time. That is, a length of time may be set by the user so that when an antenna reading arrives, it may be held by the system for a specified length of time, and subsequent reads during that time are accumulated. At the end of the time period, the reads are compared and consolidated. This is done so that redundant messages can be consolidated without losing information conveyed by different read periods.

Although the TAD analyzer application described above requires human rule designers to find the patterns in the produced table, the system may be configured to automatically analyze the data and generate or suggest Boolean rules. This will further limit the difficulties inherent in using human rule designers by not requiring that a designer locate the patterns within a set of data.

Another way to contend with the difficulties posed by using an untrained human rule designer is to use templates for system and rules setup that are pre-generated by expert rule designers. In other words, pre-designed setups for antenna 1 locations and rule sets may be designed by expert rule designers for use in various types of facility arrangements. Thus, a facility would not necessarily require that an on-site rule designer be trained to solve all of the unique setup issues of his or her facility from scratch. Instead, on-site personnel can set up the system based on a set of templates that have been pre-designed to address issues typically found in a given facility configuration. The templates may be developed by experts based on prior experience, so that there is some precedent for evaluating the utility of a rule set for a particular configuration.

Figure 9:
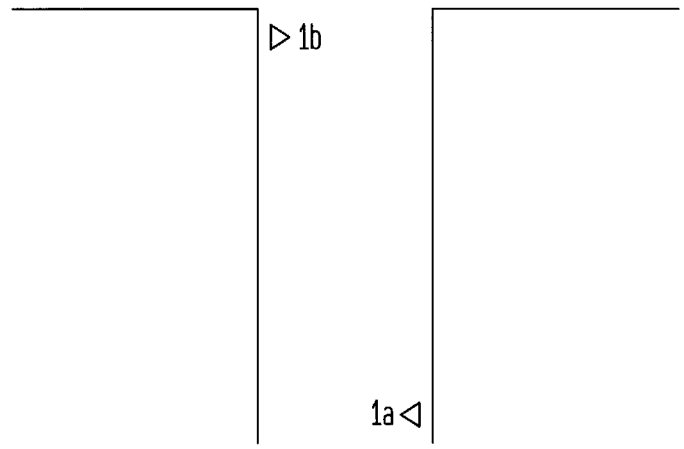
FIGS. 9–11 show illustrative facility structures for which a template may be constructed.
Figure 10:
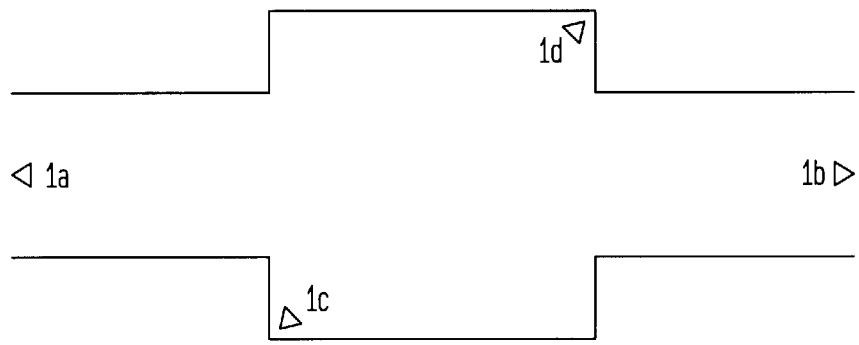
Figure 11:
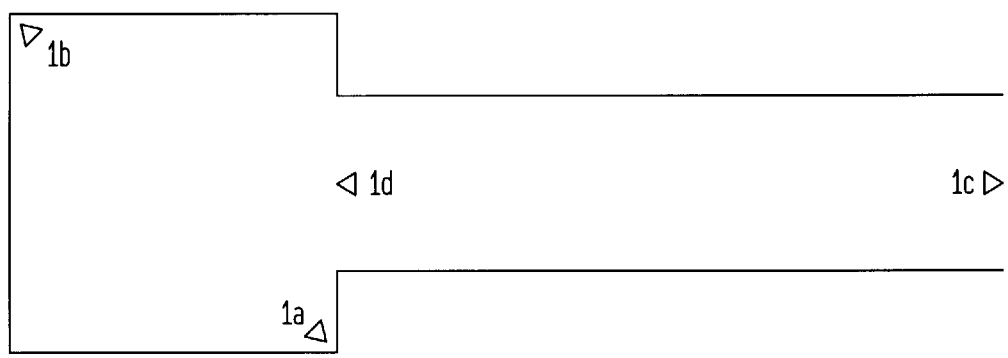

For example, users may have access to a limited set of pre-designed configurations with instructions for placing antennas 1 and using rule sets. These configurations may be available for several different facility dimensions and include common facility arrangements, such as a T-shaped hallway, a hallway with a room off to one side, or a hallway with a room at the end, such as those shown in FIGS. 9–11, respectively. Each arrangement may be divided into two or more zones. Users simply select the pertinent configuration and dimensions and follow the instructions to set up antennas 1 for that configuration. Tag 2 location then proceeds using pre-designed Boolean rule sets that are particular to that configuration in those dimensions.

Figure 12:
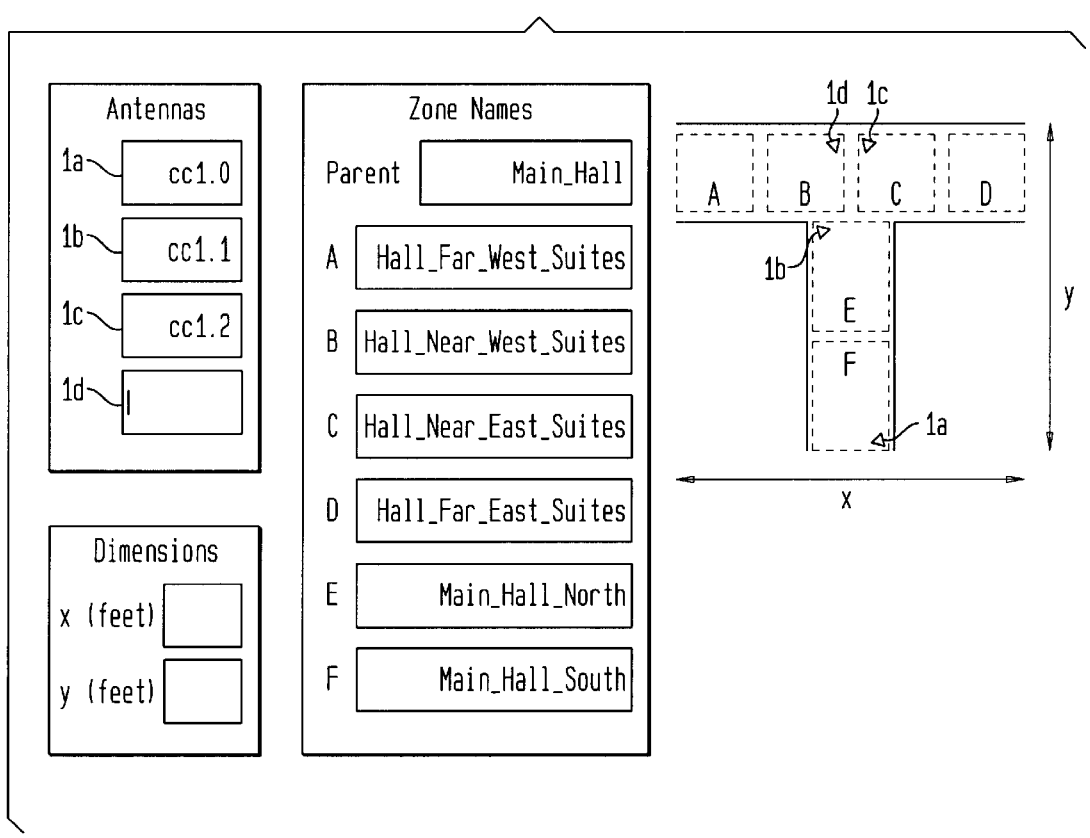
FIG. 12 shows an illustrative location system template setup for a T-shaped facility portion.

An example of a template for a T-shaped hallway is shown in FIG. 12. Each setup may show an assumed facility configuration along with antenna placement and zone definitions, and a set of Boolean rules for the zones that is based on the dimensions of the space being configured. In this illustrative embodiment, for a configuration with dimensions 200 by 100 feet, the predesigned Boolean rules may be as follows:

Top Right Far Zone D: CT(cc10.1c) & cc10.1c=40–60
Top Right Near Zone C: CT(cc10.1c) & cc10.1c=25
Top Left Far Zone A: CT(cc10.1d) & cc10.1d=40–60
Top Left Near Zone B: CT(cc10.1d) & cc10.1d=25
Bottom Far Zone E: (CT(cc10.1b) & cc10.1b=40–60)|(CT(cc10.1a) & cc10.1a=25)
Bottom Near Zone F: (CT(cc10.1a) & cc10.1a=40–60)|(CT(cc10.1b) & cc10.1b=25)
where "CT" means "closest to" and "|" represents "or." Thus, in English, the rule for the top right far zone states:
"The tag is in the top right far zone D if it is closest to Antenna 1con Controller 10 and between 40 and 60 feet from Antenna 1con Controller 10."

Once the rules are in place, they may be tested to determine whether further adjustment is necessary to improve the performance of the system.

A simple version of this system may allow the user to select an appropriate facility configuration and set the necessary parameters for the system. For example with reference to FIG. 12, the user may be prompted to input the names of the antennas 1 in the system that correspond to the antennas 1 in the template. In addition, the user may input the dimensions of the space to which the configuration will apply, provide names for the zones, etc.

A more complex system may include a wider variety of facility configurations and greater flexibility of scaling. For example, a system could be designed to work with an AutoCAD map of a facility. Users could drag, rotate, and drop various pre-designed facility configurations onto the facility map and scale or reorient them as needed. If the scaling is too great, for example, over 300%, the system may return a message stating that the template is inappropriate for use in that location. The system may also allow for further adjustment as needed in cases where, for example, it is difficult to distinguish between zones, or where certain zones need rules that are more specific than the rules provided with the template.

In suitably configured facilities, pre-designed templates may improve upon manually designed Boolean rule-based systems. Templates may eliminate the need for training an on-site rule designer who must then determine from scratch how to design rule sets that are appropriate for his or her facility. However, there is still the difficulty of having an expert rule designer create these templates. In addition, demanding users may require some adjustments to the templates to make them work better in their particular facilities. In addition, some facilities may be configured in such a way that templates can not be easily applied nor Boolean rules readily created. In such cases, a different type of zone-based or other system may be required.

There are a number of filtering techniques that may be used with Boolean rule-based or other systems to improve the quality of tag location estimates. In particular, we may want to avoid the situation in which the system alternates rapidly between zones when providing a determination of a tag's location (hereafter called "zone instability"). For example, suppose a facility is divided into zones A and B. A zone-based system may produce ten consecutive preliminary estimates for the location of a tag 2 that look like (A, B, B, B, A, A, B, A, A, A). In this situation it is difficult to tell where the tag 2 is located; based on the estimates, it looks like the tag 2 is moving rapidly between zones A and B, which may or may not be the case. There may also be a desire to avoid producing false alarms if the system is designed to trigger an alert or alarm when a tagged asset enters or leaves a particular zone. In such a case, an alarm may only be sounded when it is reasonably certain that the tagged asset really has entered or left the zone.

Prior to using Boolean rule filtering or as part of the filtering, two methods may be used to smooth the tracking data, e.g., TAD information obtained and intended for use in determining the tag location, in order to obtain tag location results that are more accurate. A first method uses exponential smoothing. With exponential smoothing, exponentially decreasing weights are assigned to past distance readings as the readings get older. This method uses one or more smoothing parameters to accomplish this. For example, a user may set a value for Sigma ($\sigma$) such that $0 \leq \sigma \leq 1$, and Beta ($\beta$)=1.00−$\sigma$. Let us assume that $d_t$ is the current distance reading for a tagged object obtained at time t. The exponential smoothing process uses $d_t$ to calculate a smoothed value, which we call the average distance over time ($A_t$). This smoothed value is used in combination with $d_{t+1}$ to produce the next smoothed value ($A_{t+1}$). This process can be illustrated as $$(\sigma \times d_t)+(\beta \times A_{t-1})=A_t$$
$$(\sigma \times d_{t+1})+(\beta \times A_t)=A_{t+1} \quad (20, 21)$$

Each smoothed value $A_t$ is the average distance up through time t. Thus, exponential smoothing in this case is a way to account for both the current distance reading and the prior history of the movement of the tagged asset. How $d_t$ and $A_t$ are weighted depends on the value selected by the user for σ. If σ is large, then current distance readings are weighted more heavily, whereas if σ is small, prior history will be weighted more heavily.

A second smoothing method may use a moving average of the last R readings to estimate the tag location. In the moving average filter, the user selects the number of readings over which to average. The higher the number of readings over which we average, the more distance readings will be smoothed out over time.

Another smoothing method that can be used is the TAD consolidation process (or other similar process) described earlier. Recall that this method uses an algorithm to manage the problem of tag dropout. The TAD consolidation process may also smooth data by, for example, using the shortest distance reading when there are two readings from the same antenna. In our earlier discussion, we used the following example:

Previous Reading: cc10.1a=6, cc10.1c=12, cc10.1d=25
Current Reading: cc10.1a=12, cc10.1b=40, cc10.1d=25
Consolidated Reading: cc10.1a=6, cc10.1b=40, cc10.1c=12, cc10.1d=25

Note that two readings were obtained from antenna 1a, and that the shorter of the two readings was kept for the consolidated reading. This smoothes out long readings, since long readings are more likely to be inaccurate than short readings. (There are a number of reasons why the system may obtain erroneously long readings, including interior geometry, which sometimes requires that the message from a tag take an indirect route to get to an antenna.)

The result of the above smoothing methods is to lessen the impact of outliers on tag location estimates. Occasionally, a system may obtain a distance reading that is longer than it should be. This can occur for numerous reasons, including environmental effects. There may be a desire that the location estimates not be unduly affected by unreliable readings. Thus, one or more smoothing methods prior to filtering, or as a part of filtering, may be used to lessen the impact of any one reading on tag location estimates.

There are several filtering techniques that may be used to reduce zone instability, a number of false alarms that may be generated, and/or other problems in an asset location system. One method is to check new readings against the most recently determined tag location. If the Boolean rules for the most recently determined tag location still apply to the new reading, the system may continue to report that the tagged item is in the same location. (This is known as having "sticky" rules.)

Another filtering process is a sequential filter, which may instruct the system not to report a change in location until N consecutive readings suggest the same location change. Another is the average filter, which is a "best of N" filter. This filter instructs the system to use the location that was seen the most in the previous N readings. (This process may, or may not, achieve the same result as the moving average filter described above. For example, the moving average filter may actually average distance readings to determine an averaged distance reading that is then used to determine tag location, whereas the average filter may look at actual tag location determinations, not distance readings, to determine whether the current tag location determination was seen the most in the previous N readings.) In this case, the reads indicating the location may or may not be sequential. With the sequential and average filter, in essence, the system bases its tag location estimates on readings that may be more reliable, thereby mitigating the effect of outliers. The asset location system may use any of the smoothing and/or filtering operations in any suitable combination. For example, the system may check whether the new location has been suggested N times in a row, and then check whether the majority of the last R readings have suggested the same new location. The values of N and R may be set depending on the needs of the user; if greater certainty is desired, N and R can be set to a greater value.

A related method that may be employed is to use time as a filter. For example, the system may not report a change in tag location until a tag has been seen in that new location for T amount of time. Again, the value of T may be set by the user depending on needs; if greater certainty is desired, T can be set to a greater value. Another approach is not to report a change in location if the new reading causes an undefined location. Again, the system eliminates unreliable readings by using only readings it has seen before and/or readings that can be resolved to a defined location.

One way to implement the aforementioned filters is to set a publish delay that is greater than zero. That is, rather than having the system publish, or otherwise report, location estimates as soon as it can determine them, the system may publish the estimates with a delay. This may allow the system, for example, to compare the last N readings, rather than publishing a location estimate immediately after receiving and processing the last of N readings.

Users may also prioritize zones and thereby control how location determinations are reported. For example, suppose that a tagged object is at the boundary between zones A and B. The system may not be able to determine whether the object is in zone A or zone B if the Boolean rules for both zones apply to the new reading. Suppose further that the tagged object is expected more often to be in zone B than in zone A. Thus, zone B may be set with a higher priority than zone A. Then, if both zone A and zone B satisfy the Boolean rules or other criteria for a new reading, the system may report that the object is in the zone with higher priority (in this case, zone B).

The stringency of requirements regarding zone instability may depend on objectives for the system. If a goal is to track the location of personnel or assets in real time, it may be desirable to allow zone instability between locations, since rapid location changes may reflect the actual movement of tagged assets. However, if a goal is to create a database of tagged asset movement, zone instability requirements may be made more restrictive, since zone instability may cause a database to fill quickly with potentially meaningless data. Likewise, if an alarm is triggered when a tag moves into a particular zone, we might want to be more certain that the tag really has moved into that zone. Using one or more filtering techniques may decrease the occurrence of false alarms.

There is, however, a tradeoff between immediacy and reliability in tag location reporting. For example, suppose that a facility has two zones and that an asset location system has been set up so that an alarm is triggered when a tagged asset enters zone A. If we want to decrease the likelihood of false alarms, the data may be filtered so that the system does not report a location change unless it sees five consecutive readings for which the same new location is estimated. For example, a tagged individual may be in zone B and pacing near the doorway to zone A. Because the individual is moving near the zone boundary, the system may occasionally report that he or she is in zone A. If we filter the data, though, an alarm may not be triggered if only one reading indicates that he or she is in zone A. However, using this kind of filtering means that there will be a delay between when an individual moves between zones and when the system reports that he or she has entered a new zone. Thus, an individual who wishes to evade an alarm can move rapidly through a zone before the system reports that he or she has entered that zone and triggers the alarm. Thus, filtering techniques may be adjusted to accommodate the objectives for the asset location system.

One way to accommodate desires of immediately and accurately determining asset location is to use two location systems that operate simultaneously (or a single location system that effectively operates as two systems). Two or more location systems may operate in parallel on a single data processing system, and each can use different instructions to locate tagged assets. One system may collect data appropriate for a database used to track historical asset movement, and a second system may collect real-time movement data. For the database, there may be a desire to collect tag location data that are more reliable over time; for the real-time data, there may be a need for greater immediacy of response. With two systems, different parameters, e.g., filtering rules, may be set for each system. Thus, for example, a history of the general locations of tagged assets may be maintained in a database without filling up the database with highly granular data. At the same time, tagged assets may be tracked in real-time and/or alarms may be triggered as necessary with greater immediacy.

Smoothing and filtering parameters may be set at a global level; that is, the same filters may be used for all of the zones in a system. However, it is conceivable that filtering for some zones may be set differently than other zones. For example, in certain zones within a facility, such as quiet office areas, false alarms may be undesirable. In other zones, such as those with dangerous equipment in which alarms are sounded when someone has entered a room without authorization, false alarms may be more tolerated. Thus, a more complex system may allow filtering parameters to be set differently for different zones.

To simplify the setting of different filtering parameters for different zones, the system may allow the user to choose different packages of settings for different types of zones. For example, one setting may be provided for alarmed zones and another setting may be provided for regular zones. The user can choose a parameter package for each zone type, and the system can apply the packages to the appropriate zones. Thereafter, adjustments could be made as needed for individual zones (such as when a particular alarmed zone requires an even lower N than the rest of the alarmed zones).

Although techniques such as filtering and using pre-designed templates may improve the accuracy of Boolean rule-based systems, other, more complex zone-based systems may result in even higher levels of accuracy. For example, two approaches, the feed-forward network and the lookup table process, do not necessarily require a human rule designer and may provide higher quality tag location estimates. Based on trials performed by the inventors using both approaches, the lookup table process may be more effective than the feed-forward network. However, the utility of either approach may vary based on the application, user requirements, etc. Below, the feed-forward network is first described, followed by the lookup table approach.

Just as neural networks may be used to classify a variety of different inputs into different categories, a neural network may be used to classify tag readings into zones or specific tag locations. Although neural networks can assume many different forms, there are several features that most such networks have in common:

Neural networks involve processors operating in parallel. This differs from traditional computer processing, which processes input serially, that is, using a specific set of instructions in sequential order.

Neural networks include an input layer, one or more hidden layers, and an output layer. The input layer takes in data, the hidden layers process the data, and the output layer generates a result based on the neuron activations produced during processing. (The processing layers are referred to as "hidden" because their activity is typically invisible to the user.)

Neural networks are typically trained to learn relationships. Usually a neural network is presented with examples and/or rules to train it to pick out patterns in input. These patterns in input produce patterns in neuronal activation. (Systems that learn by training are known as supervised systems. However, it is possible to design an unsupervised system, that is, a system designed to pick out patterns on its own, without examples or rules to guide it.) The neuronal activation patterns yield different outputs, which are compared to the "correct" outputs for the examples. The network is then adjusted so that its outputs match more and more closely to the "correct" outputs.

Neural networks can produce output based on the rules they learn. Once a neural network is trained (or, in the case of an unsupervised system, trains itself), it can use the patterns it has discerned to process new output. Again, this output is generated based on the pattern of neuronal activation produced during processing.

One of the advantages of using neural networks to determine tag location is that there exists a good deal of literature discussing how to use and design neural networks for a variety of applications. Furthermore, many researchers have claimed great success using neural networks in a wide variety of applications. Finally, one of the most appealing features of neural networks is that they can be applied to problems without a deep understanding of the intricacies of those problems. However, neural networks may have some drawbacks. Neural networks may require lengthy training times, and it may be difficult to understand what the network is actually doing and why it works. Finally, choosing the right parameters for neural networks (e.g., the number of hidden neurons, the connection model, learning rates, training methods) may be more of an art than a science, and may often be accomplished through trial and error, rather than through any deep understanding of why the parameters should be set a certain way. Masters, Timothy; *Practical neural network recipes in C++*, Burlington, Mass., Academic Press, 1993, provides an excellent introduction to various network models, including feed-forward networks, while Hertz, John, et al.; *Introduction to the theory of neural computation,* Redwood City, Calif., Addison-Wesley Publishing Co., 1991, provides a rigorous mathematical treatment of the subject.

Figure 13:
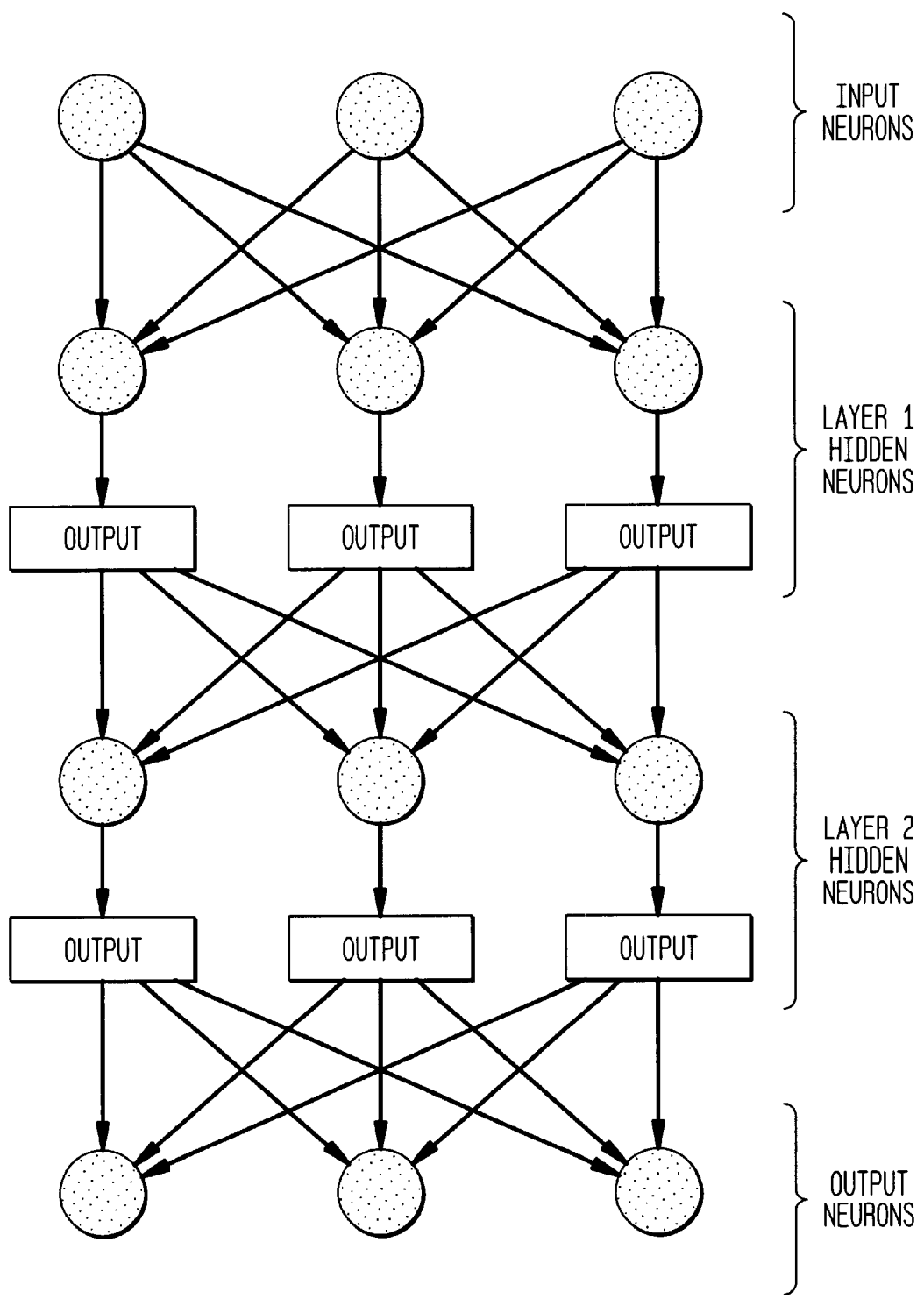
FIG. 13 is a schematic diagram of an illustrative neural network structure.

Essentially, a feed-forward network is a neural network in which input passes unidirectionally through one or more hidden layers to produce output. Each hidden layer processes the result of the prior layer, generates its own result, and passes its own result on to the next layer for further processing. FIG. 13 is a schematic diagram of one possible neural network. The arrows indicate the unidirectional nature of the network; there is no feedback loop present in this illustrative structure.

To build a prototype neural network for zone location, the inventors used the neural net software provided by Masters. This software implements a variety of neural networks and handles supervised training of a network. This software was used to implement one- and two-hidden-layer feed forward networks. Default settings were found to be satisfactory for tests, and the default sigmoid function was used for the activation function of each neuron. A mean square difference was used as the error function to be minimized during training. For the training, genetic programming and simulated annealing techniques followed by gradient descent were used.

Two input neurons were used for each antenna in the tag location system. The distance reading for each antenna was encoded in one input neuron and the "quality" of the distance reading was encoded in another neuron. (A metric that may be used to determine this quality is described below.) If an antenna did not pick up a distance reading, the distance was set to 0.5 and the quality was set to zero. When an antenna did receive a distance reading, the distance value was normalized to a real number between zero and one, and the quality was computed according to a formula designed to measure the stability of the distance reading. One output neuron was used for each zone. The output neuron with the highest activation was chosen as representing the correct zone.

Reference data of some kind may be needed to train the neural network before it can operate to determine tag locations. To train the prototype neural network, a process similar to that described above in connection with Boolean rule-based systems was used to collect reference tag data. For example and with reference to FIG. 8, a tag 2 may be moved around the various zones and another device 21, such as a handheld computer that is operated by a user, that may move with the tag 2 may communicate with the controller to report the actual current zone for the tag 2. At set intervals, the tag 2 may send a signal, or "chirp," that is received by the antennas 1. For the purposes of data collection, it may be desirable to use a quickly chirping tag 2, such as a tag 2 that chirps every quarter second. TAD data may be collected by the controller 10 for each chirp of the tag 2. When data has been collected for a particular zone, the device 21 may instruct the controller 10 to pause data collection while the tag 2 is moved to another zone. Once the tag 2 is positioned within another zone, the controller 10 may again collect reference data. The controller 10 need not stop collecting reference data while the tag 2 moves from one zone to another. Instead, the controller 10 may continue collecting data and be told by the device 21 or a user, for example, when the tag 2 has moved to another zone. Collected data may be stored in the memory 11.

In tests with five antennas and three or four zones, satisfactory levels of accuracy have been achieved using data collection times on the order of a few minutes per zone and neural network training times on the order of a few hours. Experimentation with networks having a single hidden layer, as well as with networks with two hidden layers, was performed. Networks with two hidden layers may have performed better, but exhaustive testing was not performed.

The following discussion of the Tag-Antenna Distance (TAD) quality metric mentioned above is provided to explain further how the feed-forward neural network may be constructed. As in known in the art, the distance value for a TAD reading may be computed by correlating a received signal with a reference signal. In the case where there is only a single path from the transmitting antenna 1 to the tag 2 and back, an optimal way to compute the distance may be to search for the maximum of the correlation waveform sampling units, v(n). The ideal correlation waveform (up to a scale factor) for a tag at distance d would be v(d−1)=1, v(d)=2, v(d+1)=1. This correlation waveform has a triangular peak.

When noise is present, this triangular peak may be slightly obscured by noise. When multiple antenna-tag transmission paths are present with different amplitudes, such as when reflection causes multiple transmission paths, the triangular peaks from the multiple paths add to produce a smeared correlation waveform. For example, consider the case in which the tag 2 is at distance d, but there is also a reflected path at distance d+1. The correlation waveform would be of the form v(d−1)=1, v(d)=3, v(d+1)=3, v(d+2)=1. Due to the trapezoidal nature of the correlation waveform, determining the distance becomes more difficult. When large amounts of noise or multiple paths with varying amplitudes are present, this problem becomes more pronounced. Consequently, the inventors have developed a quality metric to determine the reliability of a distance measurement from the correlation waveform. If v(n) has a clear triangular structure, then a high quality distance measurement may be extracted. Conversely, if multiple peaks or broad peaks appear in v(n), the distance measurement that is extracted is less reliable.

The quality metric is a formula that determines the quality of the extracted distance d for the correlation waveform v(n) as shown in Equation 22 below:

$$\text{Quality}\{v(n), d\} = \left[ 1 - \left(\left[1 - 2 \times Q\left(\frac{A}{\sigma}\right)\right]\right)^d \right] \times \left[1 - 2 \times Q\left(\frac{v(d)}{\sigma}\right)\right] \quad (22)$$

where

A=max {v(0), v(1), v(2), . . . , v(d−2)}.

Q(x) is the probability that a random variable with mean 0 and variance 1 is greater than x. The variance of the noise in v(n) is estimated by $\sigma^2$.

The formula above has two components. The first component represents the probability that the first peak of the correlation waveform occurs before d−2. The second component represents the probability that the large value of v(d) is caused purely by Gaussian noise with variance $\sigma^2$ and mean 0.

While the formula for quality is heuristic, in various tests it successfully distinguished between accurate and inaccurate reads. The quality metric has proved useful in computing weighted averages of current and past distance readings for filtering, and as an input parameter to the neural network designed for zone location. However, an algorithm that computes a distance using the leading edge of a correlation waveform may provide a more robust extracted distance and a reduced the need to use the quality metric.

A potentially more useful approach for determining the location of a tag involves using a lookup table. The basic idea of the lookup table approach is to create a lookup table where the keys in the table are antenna readings and the corresponding values are the zones that are most likely to have generated those readings. (Antenna readings may be TAD information or other information regarding communication between a receiver and a tag that is used to determine tag location.)

A lookup table may be constructed in a number of different ways. For example, a facility may be divided into two or more logical zones and reference data obtained for the zones. This reference data may then be stored in lookup table such that certain sets of antenna readings are associated with a given zone or tag location. Thus, when future antenna readings are received for a tag, the antenna readings may be used to identify a corresponding tag location in the look up table.

The lookup table may be populated, for example, by moving a chirping tag around each zone and collecting reference data in a way similar to that described above. For example, suppose that we want to create two zones, Office-Zone and Hall-Zone. A tag may be moved around Office-Zone while the system collects reference data. Next, the tag may be moved around Hall-Zone while the system again collects reference data. The readings for Office-Zone and Hall-Zone may then be placed into a database. Later, reference data stored in the database may be used together with current antenna readings, or "tracking data," to locate a tag 2. For example, if the tracking data was previously seen in the Office-Zone reference data, the controller 10 may determine that the tag 2 is in Office-Zone. Similarly, if the tracking data was previously seen in Hall-Zone reference data, the controller 10 may determine that the tag 2 is in Hall-Zone. This straightforward idea has a number of attractive features:

- It is easy to set up. Setting up the system is easy: Reference data from each zone is obtained to train the lookup table. Highly trained rule designers are not required.
- It is easy to identify questionable zones. After the lookup table is created from the reference data, the lookup table may be used to report zones that are difficult to distinguish. Further, reference data may be collected for the zones, the zones may be eliminated or merged, or more antennas may be added for finer discrimination between the zones.
- It is easy to fix questionable zones. If we determine that the lookup table performs poorly in distinguishing between certain zones, it is a simple matter to collect more reference data for the questionable zones and retrain the table. If it is at all possible to differentiate between the two zones, the lookup table will be able to do so, given enough reference data.
- It provides for fast training and fast operation. Both building a lookup table and querying it are fast.
- It can provide confidence estimates for decisions. The lookup table can be designed so that it not only decides which zone a tag is in, but also provides a confidence estimate for that decision.
- The error profile can be adjusted. The lookup table can be designed to value certain kinds of errors more than other kinds. For example, if an alarm is triggered whenever a tag enters Office-Zone, the asset location system using a lookup table can be designed to report that a tag is in Office-Zone only when there is a certain level of confidence that the tag actually is in Office-Zone.

Another more sophisticated approach to building a lookup table is outlined in the following steps, which are described in more detail below:

1. Collect reference data for each zone. Reference data may be collected for each zone as discussed above. The zones may be defined before and/or after reference data is collected.

2. Build conditional density estimates. Estimates of the probability densities, e.g., the probability that a given set of antenna readings indicates that a tag is in a certain location, may be constructed. A histogram may be a simple and efficient way to build these estimates. Probability distributions may be generated by multiplying samples of reference data by a potential function g(x), as is described below.

3. Choose a decision rule. Neyman-Pearson rules or maximum likelihood rules may be good choices when prior probabilities for tag location are not available. If prior probabilities are available, then a Bayesian decision rule can be used.

4. Build a lookup table. A lookup table is built to store the information necessary to make a decision. (By doing this, the tag location system may not be required to generate probability densities anew each time a new set of antenna readings is received, thus cutting down on the size and access time required of a Probabilistic Neural Network (PNN). One way to do this may be to store the conditional density estimates for each value of $\vec{x}$ (where $\vec{x}$ is a vector representing a set of antenna readings (e.g., distance readings from each antenna for a single read of a single tag)). Then each time a decision needs to be made, the conditional densities can be evaluated for each new reading and the decision rule can be applied to the results. A better way to do this may be to apply the decision rule to all recorded values of $\vec{x}$ and record the results in a lookup table. Then, when a new reading is presented, we can just look up the corresponding decision in the table.

When beginning to set up a lookup table, determining the conditional probability densities for a specific application need not be difficult. Assume that the probability distribution of antenna readings is to be determined for each zone. Formally, let us assume that there are n zones, $H_1, H_2, \ldots, H_n$ and m antennas. An antenna reading thus consists of a vector $\vec{x}$ consisting of m values representing the distances from each antenna. (In practice, readings from all m antennas may not be available. Getting readings from two or three antennas is more typical.) The probability distributions for each zone may be represented as n functions $$p(\vec{x}|H_1), p(\vec{x}|H_2), \ldots, p(\vec{x}|H_n) \tag{23}$$

Thus, $p(\vec{x}|H_1)$ may correspond to the probability density for antenna readings when the tag 2 is in zone A. If the tag 2 is moved around zone A and reference data from the antennas 1 is recorded, an estimate of the probability density function, $p(\vec{x}|H_1)$ may be made. We can repeat this procedure for each zone and collect reference data to estimate the probability densities for each zone.

Once the reference data is collected, there are a number of methods that may be used to estimate the probability density functions. Parzen, E.; "On estimation of a probability density function and mode," *Annals of Mathematical Statistics* 32 (1962), 1065–1076, describes a technique to estimate probability density functions that are used for PNNs. Hogg, Robert V., and Elliot A. Tanis; *Probability and statistical inference,* Macmillan Publishing Co., 1996, describes a method for estimating the cumulative distribution function (the integral of a probability density function) with a given level of confidence using the Kolmogorov-Smirnov statistic. The Kolmogorov-Smirnov statistic can also be used to choose a confidence level for any estimated distribution. (Confidence levels are discussed in more detail below.)

However, probably the most well-known probability density estimator, the histogram, may provide a suitable approach for estimating the probability densities for zones in an asset location system. For example, suppose that a tag 2 is moved around zone A and reference data is collected for antenna 1*a* to generate the reference data in Table 2:

TABLE 2

| Distance | Number of Reads |
| --- | --- |
| 5 | 55 |
| 6 | 439 |
| 7 | 671 |
| 8 | 389 |
| 9 | 101 |

Figure 14:
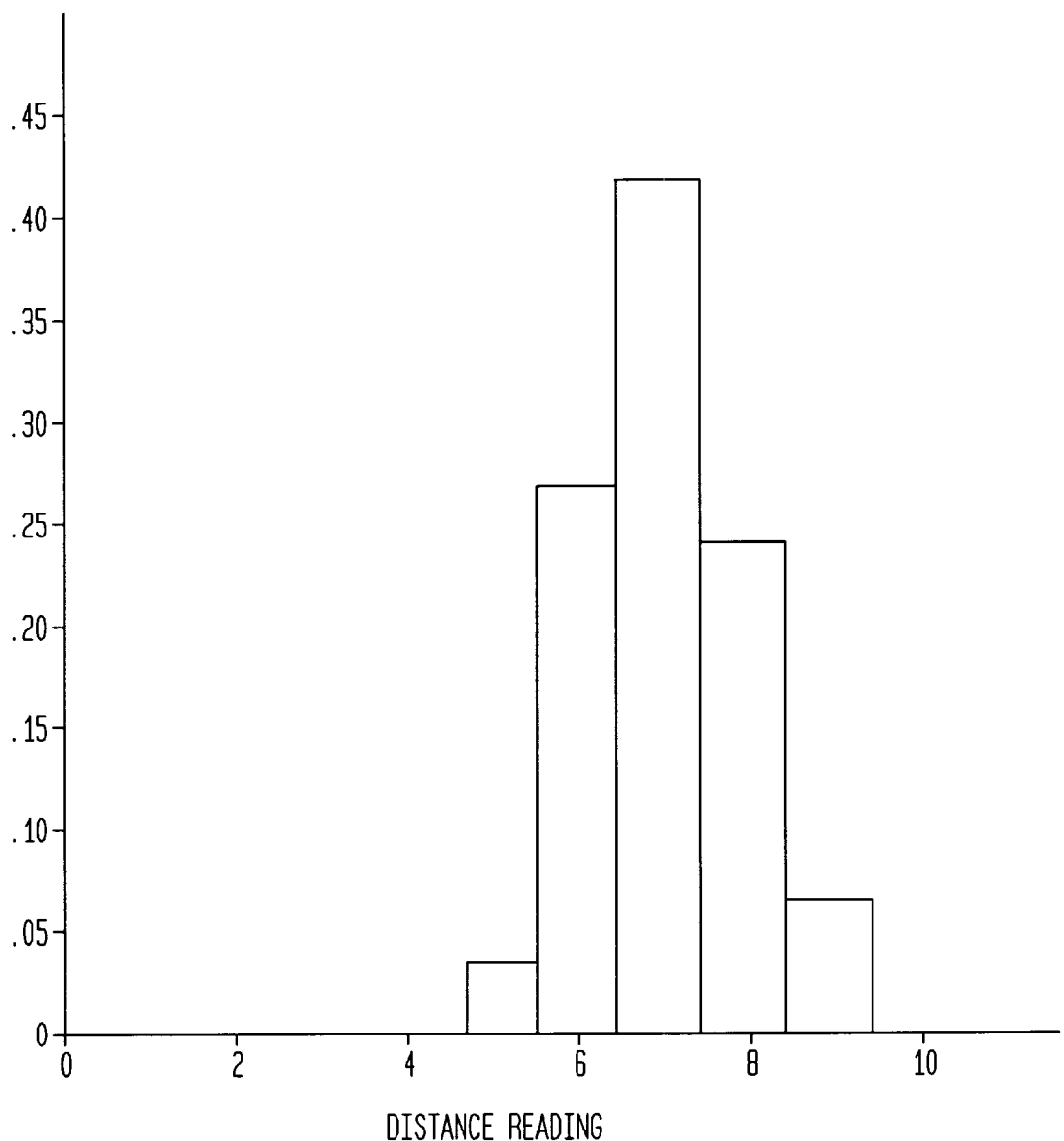
FIG. 14 is an illustrative histogram of distance readings for one receiver and one zone.

A histogram may be generated by dividing the number of reads at each distance by the total number of reads and plotting the result versus distance. The resulting histogram is shown in FIG. 14.

When the probability density function is discrete, then a histogram may be a simple and effective method for producing density estimates. If the data from the antennas is presented in a discrete form, then a histogram ma; provide a good estimator. However, if the data is presented in a continuous form, it may be appropriate to use the more sophisticated methods of estimating a probability density.

Although the histogram may provide an attractive approach for generating probability densities, in practice there may be some cases that require a more sophisticated approach. One issue concerns how to build the lookup table if the same reading is obtained when the tag 2 is in different zones. For example, assume that a tag location system is using just one antenna 1a. Suppose that while collecting reference data from Office-Zone the following reading is obtained:

$$\text{antenna } 1a=5 \qquad (24)$$

50 out of 1000 times, but we see the same reading five out of 1000 times while collecting reference data from Hall-Zone. This may indicate that there is evidently some difficulty in distinguishing between the two zones. Intuitively, it may seem obvious that we should associate Office-Zone with this reading in the lookup table. A related issue involves what should be done if we see the reading $$\text{antenna } 1a=10 \qquad (25)$$

one out of 1000 times in Office-Zone and see the reading $$\text{antenna } 1a=11 \qquad (26)$$

and $$\text{antenna } 1a=9 \qquad (27)$$

each 50 out of 1000 times in Hall-Zone. Even though reading (25) was obtained in Office-Zone, the fact that reading (26) and reading (27) were obtained in Hall-Zone suggests that something suspicious is going on. Thus, reading (25) may be made to correspond to Hall-Zone. Regardless of what zone is chosen for this reading, there will probably would not be much confidence in any decision based on such a reading.

A more sophisticated framework may be needed to address these subtleties. One such theoretical framework is closely related to work in neural networks of the Radial Basis Function type, specifically Probabilistic Neural Networks (PNN). Masters provides a good brief introduction to PNNs.

Essentially, a PNN is a particular form of neural network that has an input layer, a radial (hidden) layer, and an output layer. (A fourth layer in the form of a cost matrix can also be added to weight the outputs.) PNNs are often used to classify new data based on patterns that are discerned from training examples. (A broader version, the General Regression Neural Network (GRNN), is used when the intended output is not in the form of nominal or ordinal classes.) The radial units (neurons) correspond to the training cases. There is one output unit per class, and there are connections between each class and its associated neurons.

When new data is presented as input, neurons are activated in the radial layer based on the similarity of the new data to the training cases. The output units add up the activations of the neurons belonging to their own class and calculate approximate probability densities for each class. When normalized, these calculations provide estimates of the probability that new data belongs to a particular class. In this case, a PNN may calculate the probability that a new set of tag readings belongs to a particular zone.

This approach offers several advantages over the feed-forward network approach. One is training speed; training is nearly instantaneous and consists mainly of copying cases into the PNN. Another is ease of interpretation. It is easy to understand how probability estimates are calculated and how they can be used to determine tag location. However, there are at least two disadvantages to using the PNN approach. One is the size of the network. Because it contains all of the training cases, a PNN can potentially be very large, requiring a considerable amount of storage. A related problem involves the speed of output. The large size of PNNs slows the speed of processing new data through the network and obtaining output. One suitable approach maintains the simplicity and ease of training of a PNN and calculates probability estimates in a similar way while decreasing the size and access time required of a PNN.

Figure 15:
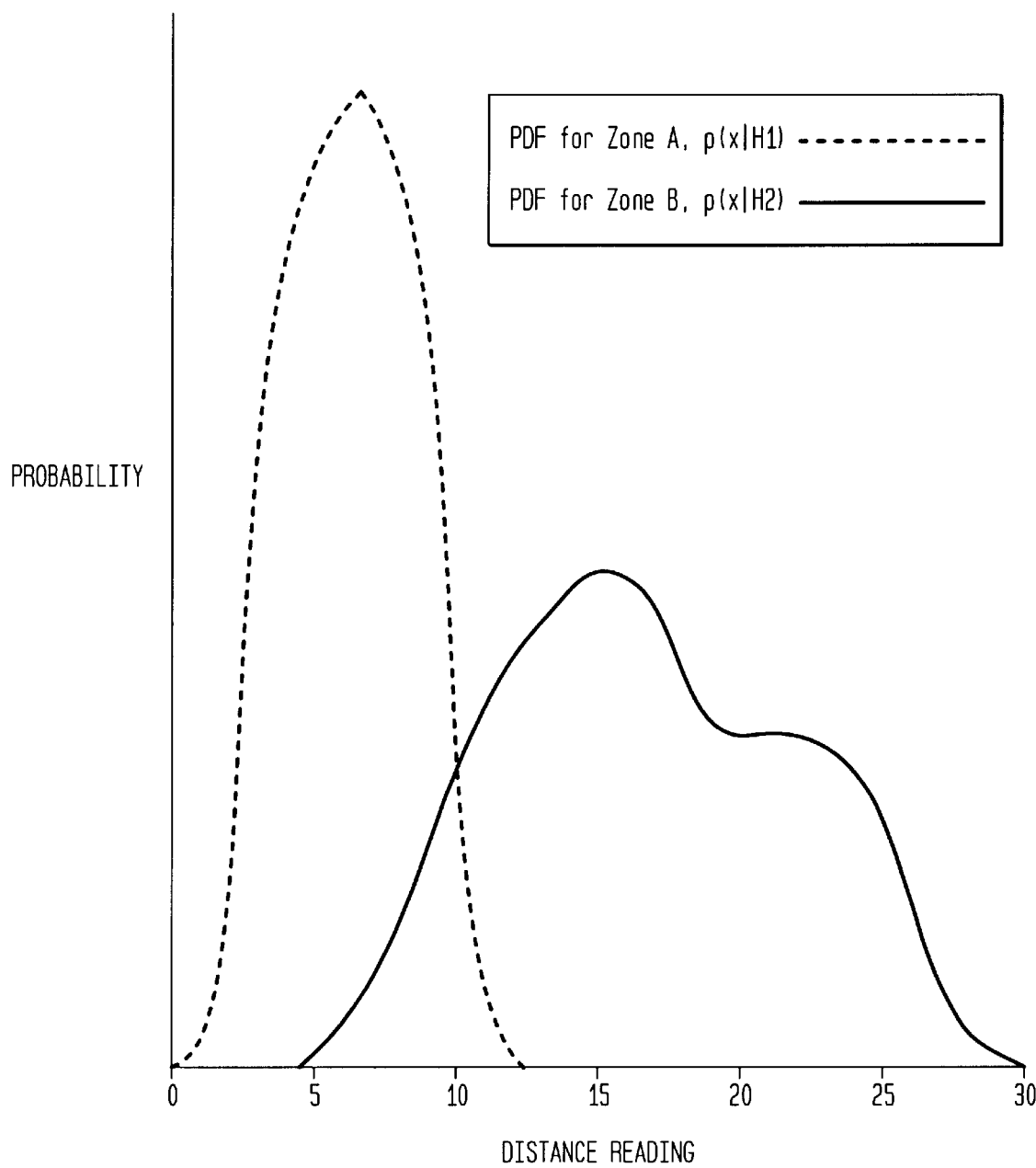
FIG. 15 is an illustrative probability distribution of distance readings for one receiver and two zones.

FIG. 15 shows an example of what the probability functions $p(\vec{x}|H_1)$ and $p(\vec{x}|H_2)$ might look like in an asset location system having two zones (n=2) and one antenna (m=1). Given the probability density estimates are known, there exists a great deal of literature in detection theory regarding how to construct an optimal decision rule when such distributions are available.

If the prior probabilities of being in each zone are available, then a Bayes Optimal Estimator may be constructed to make tag location determinations. "Optimal" in this sense refers to minimizing the expected value of a cost function that represents how costly various errors are. Assume that $c_{ij}$ is the cost for choosing zone i when the correct zone is zone j. Then the Bayes Optimal Estimator minimizes:

$$E(\text{cost}) = \sum_{j=1}^{m} c_{ij} \cdot Pr(\text{choose } i \text{ when in } j) \cdot Pr(\text{tag in zone } j) \qquad (28)$$

For example, suppose that medical equipment in a hospital is to be tracked. If the equipment is always kept in operating room A or operating room B, and 90% of the operations requiring this equipment are performed in room A, prior probabilities of 0.9 and 0.1 respectively may be assigned to these two zones. If errors were weighted equally, the cost function may be $$c_{ij} = \begin{cases} 0 & i = j \\ 1 & \text{otherwise} \end{cases} \qquad (29)$$

Usually, prior probabilities, Pr (tag in zone j), are not available or do not exist in a meaningful way. For example, suppose that someone who is carrying a tag wishes to hide. Obviously, this individual will want to be in a place where others can not find her, so it is unlikely that she will go to a location where she is expected to be found, i.e., with a high prior probability. In this case, a meaningful prior probability does not exist. When prior probabilities are not available, Neyman-Pearson estimation may be used.

With Neyman-Pearson estimation, an estimator that minimizes certain types of errors based on constraints on other types of errors may be determined. For example, an estimator may be determined that minimizes the probability of making an error when the tag is in Hall-Zone, subject to the constraint that the probability of making an error when the tag is in Office-Zone can be no more than 0.1%. This type of estimator may be quite useful if, for example, an alarm is triggered whenever a tag enters Hall-Zone and a false alarm probability of more than 0.1% cannot be tolerated.

Another option is to use a maximum likelihood (ML) decision rule. The ML rule is simple and intuitively appealing: To choose a zone for a reading, $\vec{x}$, select the zone, i, that maximizes $$p(\vec{x}|H_1) \forall I \in 1, 2, \ldots, n \tag{30}$$

For example, the maximum likelihood rule corresponding to the probability density functions in FIG. 15 may correspond to choosing zone A when the reading is less than 10 and zone B when the reading is 10 or greater.

The probability estimates can also be used to calculate a confidence level for a given decision. To gain an intuitive understanding of the relevance of confidence levels, assume that the probability densities for one antenna 1a in the system are the same as those shown in FIG. 15. Let us also assume that prior probabilities are available as follows:

$$p(H_1) = Pr(\text{tag in zone 1}) = 0.5$$

$$p(H_2) = Pr(\text{tag in zone 2}) = 0.5 \tag{31, 32}$$

and that a maximum likelihood (ML) detection rule is being used. If the antenna 1a outputs a reading representing a distance 4, using the ML rule, this reading is assigned to zone A. Furthermore, there is a relatively high confidence level that the tag 2 is actually in zone A, because the likelihood of this reading being produced when the tag 2 is in zone B is much lower than the likelihood of this reading being produced when the tag 2 is in zone A. If a distance reading of 10 is obtained, zone B would be assigned to the reading. However, there would be a relatively lower confidence level for this assignment because the likelihood of such a reading when the tag 2 is in zone B is close to the likelihood of such a reading when the tag 2 is in zone A.

Using some elementary probability theory, a rigorous approach to confidence levels may be taken. However, doing so may require prior probabilities. If prior probabilities are available, then the Bayes' theorem may be used to determine the probability that a decision is correct using Equation 33:

$$p(H_i|\vec{x}) = \frac{p(\vec{x}|H_i)p(H_i)}{\sum_j p(\vec{x}|H_j)p(H_j)} \tag{33}$$

If prior probabilities are not available, but confidence levels are desired for each tag location decision, an assumption may be made that all the prior probabilities are equal. In this case Equation 33 becomes $$p(H_i|\vec{x}) = \frac{p(\vec{x}|H_i)}{\sum_j p(\vec{x}|H_j)} \tag{34}$$

Although the assumption that all the prior probabilities are equal might not be true, it permits a determination of confidence values for tag location decisions that are still useful. These confidence values represent the confidence for the decision that would result if someone took the tag and randomly chose a zone to put it into. In effect, if equal prior probabilities are assumed, a confidence value represents how well the tag location system can distinguish among the zones given the estimated probability densities.

If prior probabilities can be obtained, such as in the earlier example involving operating rooms A and B, they can be used in conjunction with confidence levels to determine the location of a tagged asset. For example, assume as before that medical equipment is being tracked, and that the equipment is always in either operating room A or operating room B. Assume that prior probabilities of 0.9 and 0.1 have been assigned to these two zones respectively. Suppose now that FIG. 15 illustrates the probability distribution functions for the two zones. Using the prior probabilities, a threshold for a decision may be set such that zone A would always be chosen, unless the probability estimate for choosing zone B exceeds 0.9. Thus, using the numbers from FIG. 15, zone A would be chosen unless a distance reading of 12 or greater was obtained.

Confidence estimates can be quite useful in a number of applications, such as reporting the confidence level of a particular location estimate or alarm event. One of the most obvious applications is to use the confidence levels when deciding under what circumstances to trigger alarms. For example, suppose an alarm is set to go off when a tag enters zone B. If the probability densities were the same as those shown in FIG. 15, then it may not be appropriate to trigger an alarm in response to a distance reading of 10 from antenna 1a. Although the ML rule may assign the tag to zone B, the confidence level of this decision is just over 50% (assuming equal prior probabilities). In some applications, it may make more sense to trigger the alarm only when the confidence level rises above a certain threshold.

Another use for confidence levels is to stabilize tag location determinations over time. For example, suppose that in a period of four seconds readings of 7, 9, 10, and 8 are obtained from an antenna 1. If the maximum likelihood rule is used to determine the location of the tag, the tag would be assigned to zones A, A, B, and A for each reading, respectively. However, when zone B is chosen based on the reading of 10, the confidence for this choice is near 50%, while the confidence for the other choices is much higher. This could indicate that the tag was always in zone A, even when the distance reading of 10 was obtained. A number of approaches can be designed to take advantage of the confidence level in making this kind of deduction. One such approach is to ignore all decisions that have a confidence level lower than a certain threshold. Another approach may be to look at the last N readings and choose the decision with the highest average confidence level.

A different use for confidence levels may be to use them to decide whether a particular zone configuration even makes sense. For example, an installer might try to set up a system with zones that are too close together to be distinguished. This could result in a system where some zones are never chosen because the confidence level associated with these zones never rises above a certain threshold. A "Zone Checker" application may be designed to examine the data and draw attention to all zones with inadequate reference data to support a confidence level above a given threshold. This application could also calculate the average confidence level for decisions pertaining to each zone and report all zones with a low average confidence level. The application may pay particular attention to alarmed zones, since it may be desired to trigger alarms promptly, but accurately. Different thresholds may be set for alarmed and non-alarmed zones.

Thus, in addition to maintaining a tag location lookup table, a confidence value table may also be maintained. However, maintaining the confidence values requires extra storage, and thus including the confidence table may be optional.

With this theoretical framework in mind, the lookup table may be built using tag reference data and other suitable information, such as probability densities generated from the reference data. With the lookup table approach, we basically want to locate a tag based on a number of antenna readings. As mentioned above, an antenna reading may be a vector $\vec{x}$ of m numbers, where m is the number of antennas. For example, with three antennas m=3, an antenna reading could be represented as $$\vec{x} = (12, 60, 36) \tag{35}$$

Here $\vec{x}$ represents a reading where a first antenna $1a$ reads 12, a second antenna $1b$ reads 60, and a third antenna $1c$ reads 36. The goal in this illustrative embodiment is to build a location system $L(\cdot)$ that takes tracking readings as input and returns a location and a confidence level as output. For example, we may want to be able to call $L(\vec{x})$ and receive a result that looks like (D, 0.8), indicating that the system estimates the tag 2 to be in zone D with a confidence of 80%.

Most asset location systems may be expected to have a potentially large number of antennas 1. In this illustrative embodiment, each antenna 1 can have a distance reading between 0 and 255, and we have N antennas in the system. With these parameters, a lookup table implemented using an array would have $256^N = 2^{8N}$ elements. Thus, even a four-antenna system would have about four billion cells. Since only a small fraction of these cells may be expected to be filled with reference data, the lookup table may be implemented with a hash table.

A hash table is a table that maps a given item to another item. The entries in a hash table associate a particular key with a particular value (one value per key). One function of a hash table is to find the value that is associated with a given key. Finding the value requires very little time, even if there are many entries; this is an important advantage of hash tables over a very large array as described above.

To use a hash table a format for the keys is defined. The inventors have determined that using three antenna readings is usually sufficient, since using the three shortest readings are typically just as good at determining a tag location as using all of the available antennas. However, sometimes readings may only be obtained from one or two antennas. Therefore, the key needs to contain information about how many antennas saw the tag. Thus, the format for a key may be:

key=<ant-id>,<dist>,<ant-id>,<dist>,<ant-id>,<dist>,<num> (36)

where "ant-id" represents an antenna ID, "dist" represents the distance reading for that antenna, and "num" represents the number of antenna readings for the key.

If there are at most 255 antennas and 255 possible distance values, then the key may be represented as seven bytes. Note that the key format may need to be constrained further, because the keys $k_1=(1a, 7, 1b, 5, 1c, 6,3)$ and $k_2=(1b, 5, 1a, 7, 1c, 6, 3)$ both represent the same thing (3 antennas; antenna $1a$=distance 7, antenna $1b$=distance 5, and antenna $1c$=distance 6). Therefore, all keys may be sorted from lowest distance reading to highest distance reading, with the antenna ID as the tiebreaker. Thus, after sorting, both keys become k=(1, 5, 2, 6, 0, 7, 3) .

Now that the key format is specified, a decision may be made how to hash the keys. Since each key can be represented as seven bytes, we can simply treat the keys as strings and use any string-based hash function to hash our keys.

The Standard Template Library offers a generic hash table implementation via the hash-map object. (The Standard Template Library is a C++ library that provides a set of C++ container classes and generic algorithms for common type of data manipulations.) Unfortunately, the Microsoft Visual C/C++ compiler does not implement the hash-map object. Consequently, a hash table may be created that functions similarly to the hash-map object in the Standard Template Library to allow the code to work both on LINUX and Windows. The hash table object may be an array-based quadratic probing implementation. It should be understood that although specific details regarding the key format, hash table implementation and so on are described, other suitable approaches may be used for the lookup table.

The process of building the lookup table may be more complicated than simply recording reference data for each zone and putting the reference data into a table. For example, assume the case discussed above where the same reading is obtained when the tag 2 is in two different zones. For example, we might see the reading $\vec{x} = (4, 5, 6)$ 500 times in zone A and 20 times in zone B. Obviously, we need to put something in the table for this reading, but should it be zone A or zone B? In other words, should $L(\vec{x})$ return A or B?

Another problem may arise if a small number of measurements are made when obtaining the reference data. For example, while recording reference data for zone A the reading $\vec{x} = (10, 11, 12)$ may be obtained, but (because reference data is not collected for very long) a reading of the form $\vec{x}' = (1, 1, 12)$ is not obtained in any zone. Since the latter reading is very close to an actual reading, the table may somehow take advantage of this knowledge. In essence, if $L(\vec{x})$ returns zone A, then it may be desirable for the lookup table to realize that if $\vec{x}'$ is very similar to $\vec{x}$, then $L(\vec{x}')$ should also return zone A.

There may be a simple and theoretically appealing way of handling both of these situations. Assume that when a tag 2 is in zone A, there is a probability distribution $P_1(\vec{x})$ for the kind of antenna readings that will occur for that tag 2. In that case, collecting reference data for zone A corresponds to sampling $P_1(\vec{x})$ as discussed above. An estimate of $P_1(\vec{x})$ may be made by multiplying each sample of the reference data collected while a tag is in the zone by a "potential function" $g(x)$ and taking the weighted average of the samples. If we represent the m reference data points recorded from zone A as $$x_1, x_2, \ldots, x_m \quad (37)$$

our estimate is $$\hat{P}_1(\vec{x}) = \alpha \cdot \frac{1}{m} \sum_{i=1}^{m} g(x - x_i) \quad (38)$$

where α is a normalization constant chosen so that $\hat{P}_1(\vec{x})$ is a true probability density function. Similar probability distribution estimates $\hat{P}_2(\vec{x})$, $\hat{P}_c(\vec{x})$ and so on for other zones may also be determined.

After constructing probability distribution estimates, a tag location may be determined using the ML rule by choosing the zone that has the highest probability for that reading. Thus for a reading $\vec{x}$, choose zone j as the location for that tag if and only if $$\hat{P}_j(\vec{x}) > \hat{P}_i(\vec{x}) \forall j \neq i \quad (39)$$

In the example above, where the reading $\vec{x} = (4, 5, 6)$ was obtained 500 times in zone A and 20 times in zone B, this method would choose zone A because it has the highest probability for the given reading.

The other problem can be dealt with through selection of the potential function g(x). Choosing g(x) such that g(x)=1 for x=0 and g(x) 0 for all other x corresponds to using histograms to estimate the probability distributions. Formally, the estimate would be $$\hat{P}_1(\vec{x}) = \frac{\text{number of readings matching } \vec{x}}{m} \quad (40)$$

This method of estimation may be simple, fast, and reasonably accurate provided enough reference data is collected. However, when small amounts of reference data are collected, using a different potential function g(x) may populate the table more thoroughly and may yield better results.

This implementation allows a few possible settings for the potential function g(x). If the width (w) of the potential function is set to w=0, then histogram-based estimation is effectively used. That is, the lookup table will contain only values actually seen during training, which may be the default behavior. If the variable is set to w>0, then the lookup table may extrapolate in order to interpret previously unseen values that are close to values that were not collected in the reference data. This extrapolation may be done using a truncated Gaussian potential function that extends w units on each side of zero in each dimension. In the example above, where the table contained the reading $\vec{x}(10, 11, 12)$, but not the reading $\vec{x}' = (11, 11, 12)$, setting w>0 allows the system to place the latter reading in the same zone as the former reading.

The extrapolation may be performed in the following way. Suppose that the antenna reading (a, b, c) is received, and that it has already been sorted for entry into the table such that a<b<c. Assume that we want to compute the potential of the reading (a', b', c')=(a, b, c)+(x, y, z). The potential may be determined as $$g(x, y, z) = \frac{\exp(-(16x^2 + 8y^2 + 1z^2))}{2\sigma^2} \quad (41)$$

For example, g (a', b', c')=(a, b, c)+(0, 0, 0) has a potential of one, since this data point corresponds to an actual reading. The potentials for all other data points will be less than one because they are extrapolations.

Note that the factors of 16, 8, and 1 in front of $x^2$, $y^2$, and $z^2$ are arbitrarily chosen to weight the importance of the shorter antenna readings more than longer antenna readings. Since the shorter antennas may be deemed more reliable, extrapolation by changing the reading for a short antenna distance is considered a larger extrapolation than changing the reading for a longer antenna distance reading. However, other suitable factors may be used.

The value $\sigma^2$ is a shape parameter that determines the width of the Gaussian potential. The parameter w determines how many data points are evaluated for each antenna reading. For example, when w=0, the data point corresponding to the actual reading may be inserted into the lookup table without any extrapolation. When w=1, the following readings with the corresponding potentials may be inserted:

TABLE 3

| Reading | Potential | Comment |
| --- | --- | --- |
| (a, b, c) | g (0, 0, 0) = 1 | original data point |
| (a + 1, b, c) | g (1, 0, 0) | extrapolation |
| (a, b + 1, c) | g (0, 1, 0) | extrapolation |
| (a, b, c + 1) | g (0, 0, 1) | extrapolation |

Thus, the parameters in choosing a potential function are the arbitrary weightings in the exponent (16, 8, 1), $\sigma^2$, and w. No parameter may be needed to determine the height of the potential function because scaling the potential function may not effect the behavior of the lookup table.

To illustrate this point, consider the simple case when w=0 and no extrapolation is done. Suppose that the following reference data is collected in the training phase:

TABLE 4

| Reading | Number of times reading was seen in a zone |
| --- | --- |
| (antenna 1a = 6 feet, antenna 1b = 12 feet) | 2 times in zone 2 |
| (antenna 1a = 6 feet, antenna 1b = 12 feet) | 1 time in zone 1 |

The potential for the lookup table position corresponding to the reading R=(antenna 1a=6 feet, antenna 1b=12 feet) has the following potentials for each zone:

Potential for zone 1=$pot_1$=g (0, 0, 0)=1

Potential for zone 2=$pot_2$=g (0,0,0)+g (0, 0, 0)=2

The decision for this lookup table position will be zone 2, since $pot_2 > pot_1$, and the confidence level (assuming equal prior probabilities) will be $$conf_2 = \frac{pot_2}{pot_1 + pot_2}.$$

If instead we used a potential of g' (x, y, z)=K×g (x, y, z), where K is a constant, then we would have $pot_1' = K$ and $pot_2' = 2 \times K$. The decision would still be zone 2, since $pot_2' > pot_1'$ and the confidence level would be $$conf_2' = \frac{pot_2'}{pot_1' + pot_2'} = \frac{K \times pot_2'}{(K \times pot_1') + (K \times pot_2')} = conf_2.$$

Therefore, both the decision and the confidence level are unchanged.

In general, no matter what potential function we use, nor how many zones there are, scaling the potential function will not change the results. This is because all decisions are made based on the ratios of the potentials of each reading.

To summarize a strategy for building a look up table in an illustrative embodiment, first reference data is collected, e.g., by walking a tag around each zone. Next, estimates $\hat{P}_i(\vec{x})$ for i=1, 2, ..., m are constructed. Then, when a reading $\vec{x}$ is obtained, i is chosen to maximize $\hat{P}_i(\vec{x})$. Note that this requires storing $\hat{P}_i(\vec{x})$ for each value of i, as well as doing m comparisons each time we want to choose the zone for a reading. Time and space may be saved by precomputing the i (e.g., zone identifier) that maximizes $\hat{P}_i(\vec{x})$ for each value of $\vec{x}$ and storing that i in the table for the key $\vec{x}$. Thus, a temporary working table containing $\hat{P}_i(\vec{x})$ for each i may be constructed. Then, the working table may be converted to the final lookup table by going through each key, $\vec{x}$, in the working table, choosing the i that maximizes $\hat{P}_i(\vec{x})$, and storing that i for the key $\vec{x}$ in the final working table.

The confidence estimates for the zone choices may also be stored. Bayes' theorem may be used, assuming equal prior probabilities, to compute the confidence level in choosing the i that maximizes $\hat{P}_i(\vec{x})$:

$$\Pr(zone = 1 \mid \vec{x}) = \frac{P_1(\vec{x})}{(P_1(\vec{x}) + P_2(\vec{x}) + \ldots + P_m(\vec{x}))} \quad (42)$$

These confidence values may be quite useful in practice. The lookup table may report that reading $\vec{x}$ corresponds to zone A even when the tag is not actually in zone A. The confidence levels can be used to distinguish whether a reading indicates that the tag is in zone A with high probability or whether the system does not have a good idea of where the tag is, but is making its best guess. However, maintaining the confidence levels requires extra storage, and thus the user may be provided with an option of whether or not to include the confidence table.

If the option to build a confidence table is chosen, it may be built at the same time that the temporary working table is converted to the final lookup table.

A tag location system using a lookup table may also filter antenna readings and/or preliminary tag location estimates before they are used to finally determine or report a tag's location. For example, a system may use prior probabilities to filter TAD data before a location estimate is reported. Filtering may increase the accuracy of location estimates, as discussed above. A simple way of filtering the location estimates may be to choose prior probabilities that the system can apply to tag behavior. If we know, for example, how a tagged object is likely to behave, prior probabilities of the likelihood of certain events can be set. For instance, suppose that a seldom used storage closet is positioned next to a room. If a tagged individual is near the doorway between the closet and the room, the system might have difficulty distinguishing whether the individual is in the room or the closet. If we know ahead of time, however, that personnel do not need to visit the storage closet very often, we can set the prior probability for the closet to be very low. Thus, when the system sees a reading indicating that the tagged individual is in either the room or the closet, the system can use prior probabilities to locate the individual in the room, rather than in the closet.

A more complex method uses transitional probabilities to filter antenna readings; that is, the probabilities that a tagged asset will move to a given zone at time T given that he tagged asset was in zone i at time T−1. Suppose we have a simple situation involving dust two zones. The transitional probabilities $p(z_{T=A|z_{T-1}}=A)$ and $p(z_T=A|z_{T-1}=B)$ may be determined. For example, a slow-moving object would have $p(z_T=A|z_{T-1}=A)$ near one, since if it was in zone A at the last reading, it probably has not moved very much. Other sorts of transitional probabilities may be created. Assume a configuration with four zones in which zones A, B, and C are near each other and zone D is relatively distant. In this case, when a tagged object is in zone A, it might be possible for the object to move to zones B and C, but it is highly unlikely to go to zone D (at least within a relatively short time period).

If transitional probabilities are available, the probability that the object is in zone j may be determined using all the current data as:

p($Z_T$=j| all data at time T and earlier)=

$$\sum_{k=1}^{n} [p(z_T = j|\text{antenna reading at time } T, z_{T-1} = k) \cdot \quad (43)$$

$$p(z_{T-1} = k \mid \text{all data at time } T - 1 \text{ and earlier})]$$

At each time, the probability that the tag is in each zone may be determined. To update the probability that the tag is in zone j, the probabilities that the tag could have gone from being in zone k last time to zone j this time are summed, based on the transitional probabilities and the current antenna readings. The transitional probabilities may be used to filter the data in a similar way to using prior probabilities, because these probabilities indicate how likely it is that a tagged asset has moved from a given zone to every other zone. For example, the system may only report that a tagged asset has moved from one zone to another if the probability of that event is above a certain threshold.

One advantage of this approach is that at each time the probability of error in the location estimate is minimized by using the history of the movement of the tagged object. However, because of the recursive structure of the process, the amount of memory needed and the total computation needed per tag at each time step may be proportional to the number of zones. An additional feature is that this process only depends on the prior probabilities at the start. After that, it only depends on the transitional probabilities and the antenna readings. Thus, even if prior probabilities are not available, transitional probabilities may still be used. Consequently, this approach does not rely on the user being able to choose reasonable prior probabilities at the outset.

It should be understood that different data intervals can be used with the lookup table. That is, the table may contain many readings that represent tag locations that are physically close together, and/or fewer readings that cover a facility less densely. How fine-grained the table is made may depend on the needs of the user and the storage capabilities of the system. For example, a table including readings every twenty feet may cover an entire facility while using very little storage space, but such a table would not be very accurate, since it may need to do much extrapolation. Instead, the table may be constructed with six-foot intervals. This may require more storage space for the table, but would provide greater accuracy.

Alternatively, a variable interval may be used for the table. For example, a twenty-foot interval might be sufficient for covering most of a facility, but a shorter interval may be used in certain areas, such as near zone boundaries, or where high accuracy is needed to prevent false alarms. One way of doing this is to populate the table with data at twenty-foot intervals and then collect more fine-grained data to populate the table for areas requiring higher accuracy. Another way of doing this is to collect fine-grained data throughout the facility and use it to populate the table. The system can then consolidate table entries that are close together and give essentially the same result.

The lookup table may also be constructed such that tags are only located (or a location reported) when the tags are in certain discontinuous zones. For example, a user may desire only to know when assets have reached certain discontinuous points in a processing system, such as an assembly line. Thus, the lookup table need only be populated with data so that tags can be located within each zone, but not at points between zones. The zones need not be very large, since the zones may be physically separated by relatively large distances so that the asset location system has no difficulty distinguishing between them.

TEST RESULTS

The inventors have built and tested a prototype of an asset location system. Manually created Boolean rules were designed for a nine-zone system. In addition, reference data was collected for each zone by walking around each zone with a pair of tags for five minutes, and a lookup table was then built based on the reference data. Next, a tag was again walked around each zone for 2.5 minutes to gather tracking data.

One goal was to aggressively test the accuracy of the various location approaches. Therefore, while walking the tags around the different zones significant time was spent near the zone boundaries. Practical experience has shown that readings taken at zone boundaries are more likely to result in errors than readings taken in zone interiors. Consequently, the reader should not place much importance on the absolute value of the error rates shown in Table 5, but should instead consider the difference in error rates between the different approaches.

Table 5 shows the results of the various location approaches. The first column indicates the location method used. The second column indicates the confidence threshold required when using the lookup table. Readings with confidence levels lower than the threshold were discarded. The third column indicates the percentage of erroneous responses. The final column indicates the percent of readings that were found in the lookup table. For example, the third row in Table 5 has a confidence threshold of 0.5, 19.50% errors, and 92.98% of readings for which a zone was determined. This indicates that the system considered only those readings for which zones could be determined with a confidence level of at least 0.5. Of these determinations, 19.50% were in error. Roughly 93% of the readings were answered. The other 7% were either not found in the lookup table or had a confidence level below 0.5 and thus were ignored.

TABLE 5

| Method | Confidence Threshold | Percent Error | Percent Answered |
| --- | --- | --- | --- |
| Boolean rules | N/A | 36.38 | 100.0 |
| Lookup table | 0.00 | 24.51 | 99.71 |
| Lookup table | 0.50 | 19.50 | 92.98 |
| Lookup table | 0.55 | 17.49 | 90.10 |
| Lookup table | 0.60 | 15.83 | 87.23 |
| Lookup table | 0.70 | 12.81 | 81.47 |
| Lookup table | 0.80 | 10.51 | 71.25 |
| Lookup table | 0.90 | 9.45 | 67.00 |
| Lookup table | 0.95 | 9.07 | 64.27 |

As shown in Table 5, the manually designed Boolean rules were in error approximately 36% of the time. By using only five minutes of reference data collection for each zone (and a confidence level threshold of 0.0), the lookup table location method achieved an error rate of about 25%. Furthermore, the lookup table system failed to classify only 0.29% of the readings. This indicates that the lookup table method may be considerably more accurate than the Boolean rule-based system.

The accuracy of the lookup table-based system may be improved with further modification. By investigating which areas yielded the largest errors, additional reference data may be collected for those zones, thus potentially increasing the accuracy of the system. For example, suppose that when the tag is in zone A, 20% of the time our system classifies the tag as being in zone B. This indicates that there may not be enough reference data in the lookup table to distinguish accurately whether a tag is in zone A or zone B. This problem may be fixed by collecting additional reference data for zones A and B, or possibly by adding more antennas to differentiate between these zones.

There may be scenarios for which a lookup table approach might not be feasible, in which case a feed-forward network may be used. One example of this situation may be if antennas in a tag location system report a relevant variable, e.g., a signal used to determine a tag-antenna distance, with a large dynamic range. In this case, a lookup table approach might have difficulty storing the necessary data, whereas a neural network may not suffer from this limitation.

Recall from the discussion above that there are a number of filtering techniques that can be used to improve the quality of location estimates. Many of these techniques may also be used with the lookup table approach. In addition, tracking data may be smoothed before filtering, or as a part of filtering. For example, the asset location system may not report a change in location until N consecutive antenna readings suggest the same location change, or until the majority of the last N readings suggest the same location change. The system may not report a new location until a tag has been seen in that location for T length of time, or if the new reading causes an undefined location.

The tracking data may also be filtered using prior probabilities as discussed above. The system can use prior probabilities to set a level of "stickiness" for the zones, which may be similar to the use of sticky rules described earlier. For example, it may be specified that a certain tag will almost never be in a certain zone. One simple way of doing this would be to choose prior probabilities that the system can apply to tag behavior. For instance, if we expect that a tagged employee almost never enters a certain area, that event will have a low prior probability. Thus, the system may not often report that the employee has entered that area.

A more complex method utilizes transitional probabilities; that is, the probabilities that a tagged object will move to a given zone at time T given that the tagged object was in zone i at time T−1. This method accounts for both the current reading and prior history. Recall that transitional probabilities may be determined by considering the probability that the tagged object could have gone from being in zone k last time to zone j this time, based on the current antenna readings and the tagged object's behavior up until now. The two aforementioned methods may take advantage of any knowledge about how tagged assets behave.

In addition, with the lookup table approach, users can choose to store confidence levels for each location decision stored in the lookup table. If these levels are stored, a confidence level threshold, for example, 80%, may be specified. Thus, the system may not report a determined location if the confidence level for that decision is less than 80%.

Similarly, the Boolean filtering techniques may be modified to take advantage of confidence levels. For example, the system may not report a change in location unless the previous N readings suggest the same change in location with confidence greater than a threshold. This type of filtering may assure that the system will report only those decisions in which it has substantial confidence and will ignore unreliable readings.

Confidence levels can also be used to limit zone instability. One simple method would be to set a confidence threshold of C and instruct the system only to change the estimated location when readings with confidence greater than C are received. This could potentially limit zone instability for the following reason. Even if the tag were on a boundary, readings with high confidence are usually correct. If the erroneous readings have a confidence level less than C, then they will be ignored. Since the system may ignore the low confidence readings that are causing zone instability, the location estimates may be more stable.

Another method may be to use confidence levels to filter over time. One way of doing this is to allow the user to set a window of readings N, and a confidence threshold C. Whenever a reading with confidence level greater than C is received, the system will use that reading to estimate the tag location. However, if the reading has a confidence level less than C, then the reading with the highest confidence out of the last N readings may be used instead. This "best of N" system may filter out random readings with low confidence estimates.

Alternatively, confidence levels could be used to decide when alerts or alarms are triggered. For example, alarms may be triggered only when the confidence level for a decision reaches a certain threshold, e.g., 90%. Another option is to report only those tag location decisions associated with a confidence level above 70%, and in addition only trigger alarm conditions when the confidence level rises above 90%. Suppose that a facility has someone monitoring the location of objects in real-time. If the monitor notices that the system has reported a location change, he or she might direct someone to investigate an area where an alarm has not yet been triggered, but where readings suggest unauthorized activity may be occurring.

Another way to decrease the likelihood of false alarms using confidence levels may be to specify that the system should trigger an alarm only once for a given event. For example, a relatively low threshold to trigger an alarm may be set initially, so that immediate notice of any potentially unauthorized activity may be received. However, after the alarm is triggered, the system may only trigger another alarm after a given period of time. For instance, suppose that a tagged individual is lurking about near the entrance to a restricted-access room. Setting a low confidence threshold would allow the system to trigger an alarm, thus quickly alerting a user of a potential problem. However, the system may only be permitted to trigger an alarm once for a given area within a five minute time period. Thus, if zone instability causes the system to report multiple changes in location for the individual, who is near a zone boundary, the system will not repeatedly trigger an alarm for every detected location change.

Still another way to decrease the likelihood of false alarms using confidence levels may be to set two different confidence thresholds, $C_1$ and $C_2$. A relatively low confidence threshold $C_1$ may be set to place a tagged object within a location at the outset. However, once a tag is determined to be within in a zone, a higher confidence threshold $C_2$ may be set to allow the system to report that the tag has moved from one zone to another. This method may decrease both zone instability and false alarms, but may not constrain the system by requiring a high level of confidence for the first location of a tagged asset.

Another use for confidence levels is similar to the dual locator service setup described above. Two different confidence thresholds, $C_1$ and $C_2$, may be set. Tag location estimates with a confidence level greater than $C_1$ may be used to track real-time movement, while estimates with a confidence level greater than $C_2$ may be collected in a database. For the real-time data, greater immediacy of response may be desired, and thus a lower confidence threshold; for the database, more reliable information over time may be desired, and thus a higher confidence threshold. Using this method, a history of the general locations of tagged objects may be stored in a database without filling up the database with potentially meaningless data. At the same time, tagged objects may be tracked in real-time and alarms may be triggered as necessary with greater immediacy.

Table 5 shows some of the possible advantages of using a lookup table with a confidence threshold. For example, when a confidence threshold of 0.55 was used, the lookup table process achieved an error rate of half that of the Boolean system. A confidence threshold of 0.55 resulted in only 10% of the readings being ignored. In practice, this may result in an occasional slight delay before the system realizes that a tag has changed position, while yielding better accuracy.

Whether an alarm is triggered might depend on prior history of a tagged asset's movement as well. With reference to FIG. 8, a system may be configured to sound an alarm if an individual is within zone C. Thus, if a tagged individual is within zone C, but at the border between zones B and C, the system may trigger an alarm. However, whether the system should sound an alarm in this situation may depend on the prior history of the individual's movement. For example, if the individual was most recently determined to be in zone D and is now determined to be at the border between zones B and C, it is likely that the individual must have moved through zone C, and thus the system should trigger an alarm. However, if the individual was most recently determined to be in zone A, the system may not trigger an alarm when the individual is determined to be at the border of zones B and C. Instead, the system may wait until a confidence level for the individual's location in zone C is higher before sounding an alarm. Thus, the system may be configured to account for prior history so that it can decide more intelligently whether an alarm should be triggered.

One simple example of how prior history may be accounted for uses parent locations to determine whether an alarm should be triggered. Different triggering rules may be set depending on whether the alarm is an entry alarm (an alarm triggered by unauthorized entry into an area) or an exit alarm (an alarm triggered by unauthorized departure from an area). For an entry alarm, an alarm may be triggered if a tagged asset is in an alarmed zone now and was last seen in a zone from a different parent. For example, if the ninth floor of a building is restricted, and a tagged individual was last seen on the eighth floor, but is now seen on the ninth floor, the system may trigger an alarm. Similarly, for an exit alarm, the system may trigger an alarm if a tagged asset was last determined to have been in an alarmed zone, but is now seen in a zone from a different parent. For example, if a tagged baby was last seen in the fourth-floor maternity ward of a hospital, which is alarmed, and the baby is now seen on the ground floor, the system may trigger an alarm. However, if the baby was last seen in one room within the maternity ward and is now seen in a different room on the same floor, we might instruct the system not to trigger an alarm, since the baby has not yet left the maternity ward. This parent-based examination of past tag movement history provides another way to lessen the likelihood of false alarms.

A lookup table might be especially useful in certain situations. If tags are to be located in a limited number of positions, auto zone lookup tables may work particularly well. For example, a tagged asset may need to be located when it has reached certain points on an assembly line in a plant. If so, a large amount of reference data may be collected from those locations. If the locations were non-contiguous, the system may not have data to identify the location of tags positioned between locations. So, even if the plant were very large, the lookup table need not be very big, and since the locations at which tags are to be identified are non-contiguous it is unlikely that the system would confuse one location with another.

The type of system that is used to determine tag location may depend on the setting and needs of the user. For example, in a hospital setting, it may be relatively easy to set up logical zones for a zone-based system. Various rooms and hallways are naturally modeled using zones, and useful information can be obtained in knowing that tagged objects, such as crash carts, wheelchairs, and patients, are in the zone representing room 102, for example, or the east end of the hallway on the eighth floor. However, not all facilities are easy to model using a zone-based system. Users in manufacturing facilities without well-defined stations for various processes might find it more useful to locate objects by triangulation. In such cases, it may be easier to determine where a product is in the manufacturing process by pinpointing its location in a facility with X-Y coordinates, rather than by setting arbitrarily-defined zones.

In some cases, it may be desirable to use multiple location methods in conjunction with one another. A system may be set up to report the location of a tagged object using X-Y coordinates, a Boolean-rule-defined zone, and a lookup-table-defined zone. That is, the system can use triangulation to estimate an object's X-Y coordinates in a grid representing a facility. It can then report a zone estimated by applying Boolean rules to TAD data. It can finally use the lookup table to report an estimated location (as well as a confidence level for that decision, if desired).

The user can instruct the system as to the order of priority location estimates determined by each of the methods. For example, a user might indicate that the system should report a zone using the lookup table first, and then narrow the location further using triangulation. The user might also specify that the system should only report decisions from the lookup table if the confidence level for those decisions exceeds 70%. For the instances in which the confidence level is lower than the threshold, or in which the lookup table returns an undefined location, the system can be instructed to use Boolean rules to return a location. The system can be further instructed to check the most recent location first when using Boolean rules in order to increase reliability further.

Figure 16:
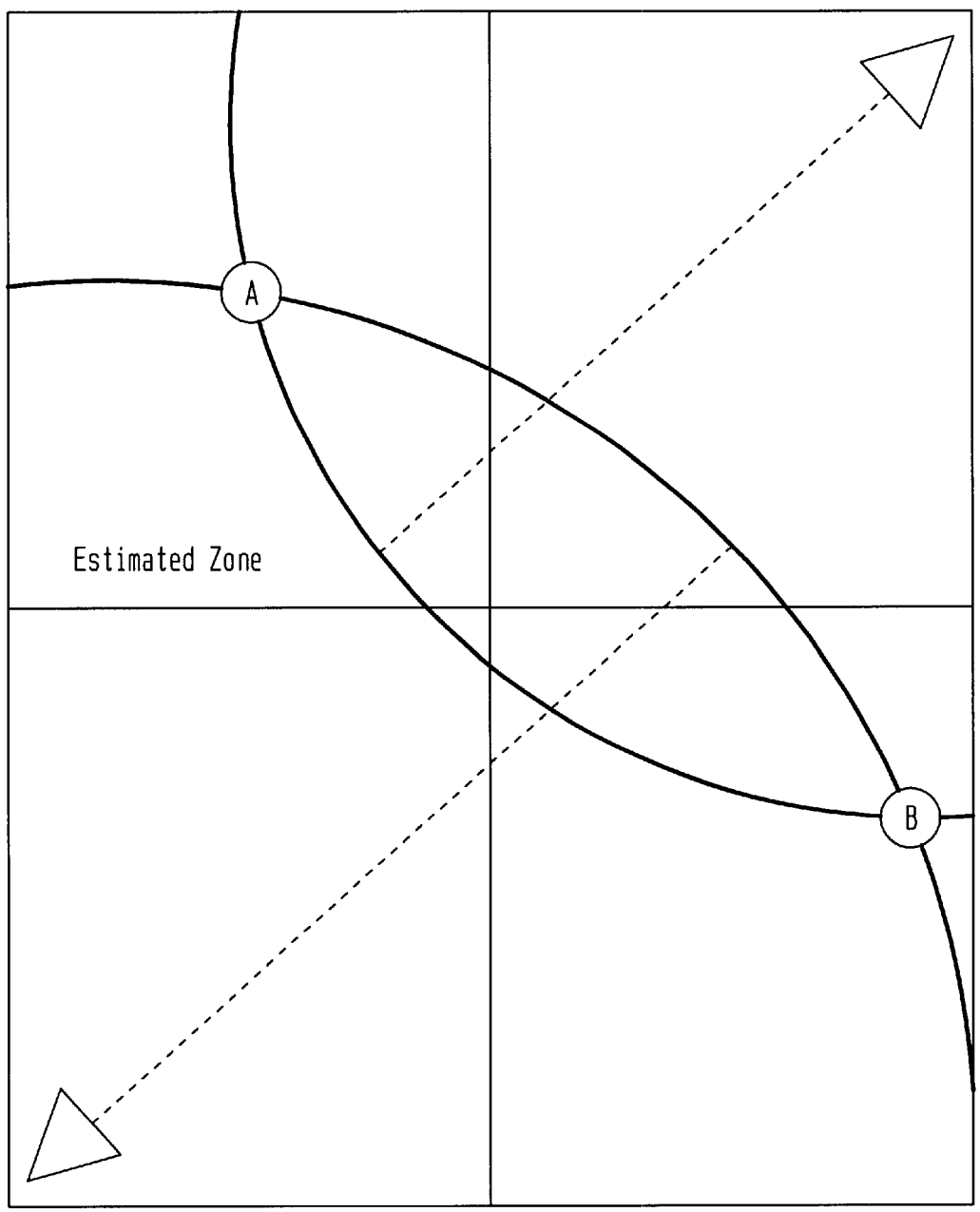
FIG. 16 illustrates two possible tag location determined using a geometric analysis and one tag location determined using a non-geometric analysis.

Another way to combine multiple location methods relies on using a two-step system. Boolean rules or a lookup table-based system can first be used to constrain the general location of a tagged object. Then, triangulation can be used to estimate a more precise location for the object. Since triangulation may produce multiple location estimates for each set of readings, Boolean rules or a lookup table can tell us beforehand which of the estimates is likely to produce the correct location. An example of this can be seen in FIG. 16. In this situation, Boolean rules or a lookup table have been used to determine in which zone a tagged object is likely to be located, e.g., the top left quadrant. Triangulation has produced two estimates for the possible location of the object (A and B), but only one of those estimates falls within the estimated zone. Thus, the object is more likely to be in location A than location B.

Figure 17:
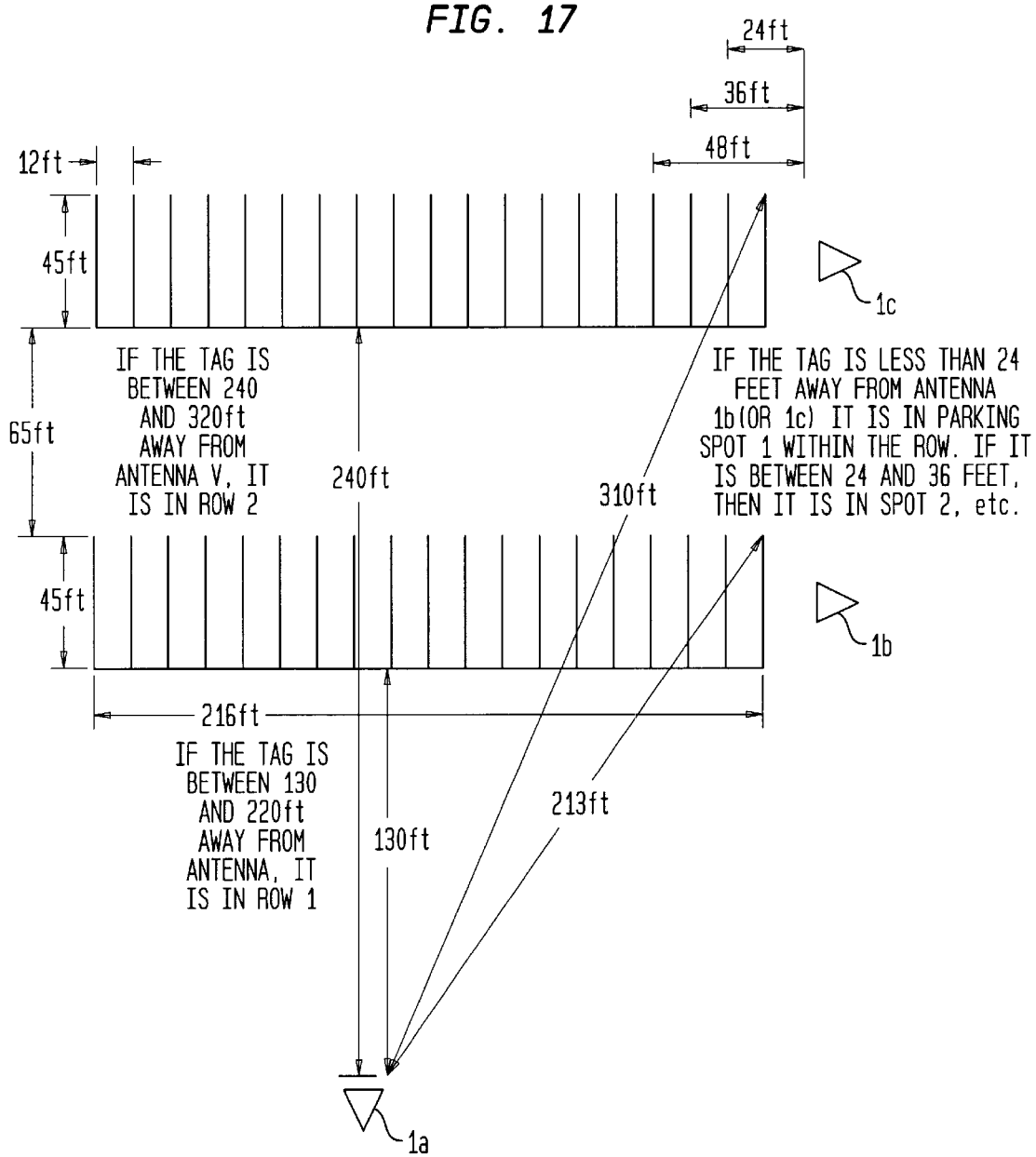
FIG. 17 is a schematic diagram of an asset location system for an illustrative parking lot facility.

A more specific example of this use is shown in FIG. 17, which shows a large parking lot such as might be used for tractor-trailers. Suppose that we want to locate a shipment of goods on a particular truck that has just come into the lot. If each truck is tagged, then we can use triangulation to find the location of that particular truck within the lot. However, triangulation by itself may give us more than one location where the truck might be. The rules shown in FIG. 17 can limit the possible location of the truck to a particular parking space, or tell us that the truck is not yet parked in a space.

Although several of the illustrative embodiments described above use zone-based location methods, e.g., such as those that may be used with PinPoint Corporation's 3D-iD product, similar methods can be used with other Real Time Locating Systems (RTLS). One example of an RTLS with which zone-based location methods can be used is a system using signal strength to determine location, such as the PalTrack system created by Sovereign Tracking Systems. With signal strength systems, tags send out signals periodically, and the system analyzes the strength of the received signal to determine distance from an antenna. Multiple distance readings taken together can be used to estimate the location of a tag. Although such systems do not allow for high resolution in distance estimation, the methods described herein can nonetheless be applied. For instance, rather than placing TAD reference data into an initial table and using it to construct conditional density estimates, signal strength reference data may be used. In this case, the temporary working table may contain estimates of the likelihood of obtaining particular signal strength readings from particular antennas when the tag in each zone. Then, a final lookup table can be constructed that associates particular signal strength readings with particular zones.

Another type of system with which these methods can be used is the system developed by WhereNet. With this type of system, tags send out signals periodically, and they arrive at different antennas at different times. The system uses the difference between the arrival times to estimate the location of a tag. Although this approach is different from that used with the 3D-iD system, the methods discussed above can still be applied. For instance, rather than placing TAD reference data into the initial table and using it to construct conditional density estimates, time difference of arrival data may be used. In this case, the temporary working table may contain estimates of the likelihood of obtaining particular time difference combinations from particular sets of antennas when in each zone. Then, a final lookup table can be constructed that associates particular time difference combinations with particular zones.

Other features, such as the various smoothing and filtering techniques, can also be applied to these different types of systems. For instance, the notion of a "best of N" filter, consolidation of time of arrival data, or a confidence threshold may be used in a variety of different systems. Although the implementation may be somewhat different for different types of systems, the general principles discussed herein remain valid and useful. Thus, zone-based location systems can be used to improve the accuracy of location estimates not only with systems like the 3D-iD system, but also with a variety of other Real Time Locating Systems.

Various aspects of the invention can also be applied to ultrasonic motion/position tracking systems. Such systems send ultrasonic signals from transmitters to receivers and calculate the distance between a transmitter and a receiver using time of flight (TOF) data. These systems can have a very high resolution, locating objects to within several inches or less. In this case, a lookup table can be populated with TOF data rather than TAD data. In this case, a temporary working table may contain estimates of the likelihood of obtaining particular TOF readings from particular receivers when a tag is in each zone. Both the measurement intervals and the zones themselves may be small (on the order of inches, or even smaller as the system resolution permits and as required by the user). A final lookup table can be constructed that associates particular TOF readings with particular zones.

In some systems, such as certain ultrasonic systems, a receiver is attached to the asset to be tracked, while the transmitter is part of an infrastructure. This is essentially the opposite of systems such as the 3D-iD system or that shown in FIG. 8, in which a transmitter is part of the tag and the receiver is part of the infrastructure. Nonetheless, aspects of the invention may still be applied with these "reversed" systems. As before, the temporary working table would contain estimates of the likelihood of obtaining particular TOF readings from particular receivers when in each zone. Then, as with the 3D-iD system, a final lookup table can be constructed that associates particular TOF readings with particular zones.

While the invention has been described in conjunction with specific embodiments thereof, it is evident that many alternatives, modifications and variations will be apparent to those skilled in the art. Accordingly, embodiments of the invention as set forth herein are intended to be illustrative, not limiting. Various changes may be made without departing from the invention.

What is claimed is:

1. A system for determining a location of a tag, comprising:
    at least one receiver that receives a signal from the tag;
    a controller that communicates with the at least one receiver; and
    a memory that stores information regarding previous communication between at least one receiver and a reference tag while the reference tag was in at least two different locations;
    wherein the controller determines a location of the tag based on information stored in the memory regarding the previous communication with the reference tag; and wherein the controller provides a plurality of configuration setting packages that can be selected by a user.

2. The system of claim 1, wherein the information stored in the memory regarding communications with the reference tag is based on at least one of a time of arrival of a signal from the reference tag at a receiver, a round trip time of flight of a signal between a receiver and the reference tag, a time difference of arrival of signals received at two or more receivers, a strength of a signal received at a receiver, variable receiver sensitivity to a signal sent from the reference tag, and an ultrasonic signal sent from the reference tag.

3. The system of claim 1, wherein the information stored in the memory is indicative of a distance between at least one receiver and the tag.

4. The system of claim 1, wherein the information stored in the memory includes a quality metric to determine a quality of a signal received from a tag.

5. The system of claim 1, wherein the controller displays information representing previously detected signals from the reference tag.

6. The system of claim 5, wherein the displayed information includes an indication of a distance between the reference tag and a receiver while the reference tag was located within a zone.

7. The system of claim 1, wherein the controller stores a set of rules used to determine a tag location using communications between at least one receiver and the tag, the rules being generated based on the previous communications with the reference tag.

8. The system of claim 1, wherein the controller uses the information regarding previous communication with the reference tag to train a neural network.

9. The system of claim 8, wherein the neural network is a feed-forward network that is used to determine tag location.

10. The system of claim 1, wherein the controller uses the information regarding previous communication with the reference tag to populate a lookup table.

11. The system of claim 10, wherein the lookup table is a hash table used to determine tag location.

12. The system of claim 1, wherein an individual zone may be selected as a particular type of zone by a user and a corresponding configuration package is used to control how the controller determines tag location for the selected zone.

13. The system of claim 1, wherein the controller provides user configurable settings for at least one of sequential filtering of tag tracking data, average filtering of tag tracking data, time filtering of tag tracking data, and a tag location publication delay.

14. The system of claim 1, wherein the controller determines a confidence level for the location determined for the tag.

15. The system of claim 14, wherein the confidence levels are determined based on one of prior probability information regarding the tag, and a transitional probability for the tag.

16. The system of claim 14, wherein the controller uses the confidence level to determine whether to indicate that the tag has moved from one location to another.

17. The system of claim 16, wherein the controller uses a variable threshold to determine whether to indicate that the tag has moved from one location to another, the variable threshold being variable depending upon a zone in which the tag is located.

18. The system of claim 16, wherein the controller uses a variable threshold to determine whether to indicate that the tag has moved from one location to another, the variable threshold being variable depending upon whether the tag location is to be used for real-time tracking or archival purposes.

19. The system of claim 14, wherein the controller uses the confidence level to identify zones in which tags are seldom located.

20. The system of claim 14, wherein the controller uses the confidence level to trigger an alarm based on the tag location.

21. A method for locating a tag, comprising:
receiving a signal from a reference tag;
storing information regarding the signal received from the reference tag, the signal being received from the reference tag while the reference tag is in at least two locations;
determining a location of the tag based on the stored information regarding the signal received from the reference tag; and
providing a plurality of configuration setting packages that can be selected by a user.

22. An article of manufacture comprising instructions to control a data processing apparatus, the instructions operative to cause the data processing apparatus to perform the method of claim 21.

23. The method of claim 21, wherein the step of storing information comprises storing information that is based on at least one of a time of arrival of a signal from the reference tag at a receiver, a round trip time of flight of a signal between a receiver and the reference tag, a time difference of arrival of signals received at two or more receivers, a strength of a signal received at a receiver, variable receiver sensitivity to a signal sent from the reference tag, and an ultrasonic signal sent from the reference tag.

24. The method of claim 21, wherein the step of storing information comprises storing information that is indicative of a distance between at least one receiver and the reference tag.

25. The method of claim 21, further comprising storing a quality metric to determine a quality of a signal received from a tag.

26. The method of claim 21, further comprising displaying information representing previously detected signals from the reference tag.

27. The method of claim 26, wherein the step of displaying information comprises providing an indication of a number of antenna readings indicating a tag-antenna distance while the reference tag was located within a zone.

28. The method of claim 21, wherein the step of determining a location comprises using a set of rules used to determine the tracking tag location using communications between a receiver and the tracking tag, the rules being generated based on the stored information regarding previous communications with the reference tag.

29. The method of claim 21, further comprising using the stored information regarding previous communication with the reference tag to train a neural network.

30. The method of claim 29, wherein the step of using the stored information comprises using the stored information to train a feed-forward network that is used to determine tag location.

31. The method of claim 21, further comprising populating a lookup table that is used to determine a location of the tracking tag using the stored information regarding previous communication with the reference tag.

32. The method of claim 31, wherein the step of populating comprises populating a hash table used to determine tag location.

33. The method of claim 21, wherein the step of providing comprises
providing zones that can be selected as a particular type of zone by a user, and the method further comprising:
using configuration packages that correspond to the selected zones to control how the controller determines tag location for the selected zones.

34. The method of claim 21, further comprising providing user configurable settings for at least one of sequential filtering of tag tracking data, average filtering of tag tracking data, time filtering of tag tracking data, and a tag location publication delay.

35. The method of claim 21, further comprising determining a confidence level for the location determined for the tracking tag.

36. The method of claim 35, wherein the step of determining a confidence level comprises determining confidence levels based on one of prior probability information regarding the tracking tag, and a transitional probability for the tracking tag.

37. The method of claim 35, further comprising using the confidence level to determine whether to indicate that the tag has moved from one location to another.

38. The method of claim 35, further comprising using a variable confidence level threshold to determine whether to indicate that the tag has moved from one location to another, the variable threshold being variable depending upon a zone in which the tag is located.

39. The method of claim 35, further comprising using a variable confidence level threshold to determine whether to indicate that the tag has moved from one location to another, the variable threshold being variable depending upon whether the tag location is to be used for real-time tracking or archival purposes.

40. The method of claim 35, further comprising using the confidence level to identify zones in which tags are seldom located.

41. The method of claim 35, further comprising using the confidence level to trigger an alarm based on the tag location.

42. A method of setting up a system for determining a location of a tag within a facility, comprising the acts of:
providing a template of at least one tag locating system comprising at least one zone layout including a receiver locations layout and corresponding rules;
selecting a zone layout;
placing receivers at receiver locations defined by the receiver locations layout; and
using the corresponding rules to set up the system.

43. The method of claim 42, wherein the act of providing the template comprises:
providing tag location rules that are used to determine a location of a tracking tag based on at least one signal received by a receiver; and
wherein the step of placing receivers at receiver locations comprises establishing a physical size of at least one zone in the zone layout.

44. A method of determining a location of a tag, comprising:
providing at least one device to communicate with the tag;
receiving a signal representing communication with the tag;

determining a preliminary location for the tag based on the signal;

filtering the preliminary location for the tag using one of sticky rule filtering, sequential filtering, average filtering, time filtering and a tag location publication delay, before using the preliminary location to determine the tag location;

receiving user input configuration parameters that are used to adjust the filtering of the preliminary location; and providing packages of user configurable parameters that can be selected and used for filtering preliminary location data from a specific zone.

45. The method of claim 44, wherein the step of receiving user input comprises:

receiving different sets of user input configuration parameters for different zones.

46. The method of claim 44, further comprising:

determining a first location for the tag, the first location intended for use with real-time tracking of the tag; and determining a second location for the tag, the second location intended for use storage in a tag movement archive.

* * * * *

UNITED STATES PATENT AND TRADEMARK OFFICE
CERTIFICATE OF CORRECTION

PATENT NO. : 6,456,239 B1
DATED : September 24, 2002
INVENTOR(S) : Werb et al.

It is certified that error appears in the above-identified patent and that said Letters Patent is hereby corrected as shown below:

Column 4,
Equation 3 should read -- $D_A = \sqrt{\Delta X_A^2 + \Delta Y_A^2}$ --

Equation 5 should read -- $\pm Y_U = \sqrt{D_0^2 - X_U^2}$ --

Column 7,
Equation 15 should read -- $D_{horizontal}(V + \delta) = \sqrt{D_{measure}^2 - (V + \delta)^2}$ --

Equation 16 should read -- $D_{horizontal}(V + \delta) = \sqrt{D_{measure}^2 - V^2 + 2V\delta - \delta^2}$ --

Column 19,
Line 30, replace "with the controller to" with -- with the controller 10 to --

Column 23,
Line 18, replace "ma;" with -- may --

Column 25,
Equation 30 should read -- $p(\vec{x} \mid H_i) \, \forall i \in 1, 2, \ldots, n$ --

Column 28,
Line 49, replace -- "$\vec{x}' = (1, 1, 12)$" with -- $\vec{x}' = (11, 11, 12)$ -- --

Column 30,
Line 34, replace "$\sigma^2$" with -- $\sigma^2$, --

Column 31,
Equation 42 should read -- $\Pr(zone = 1 \mid \vec{x}) = \dfrac{P_1(\vec{x})}{(P_1(\vec{x}) + P_2(\vec{x}) + \ldots + P_m(\vec{x}))}$ --

UNITED STATES PATENT AND TRADEMARK OFFICE
CERTIFICATE OF CORRECTION

PATENT NO. : 6,456,239 B1
DATED : September 24, 2002
INVENTOR(S) : Werb et al.

It is certified that error appears in the above-identified patent and that said Letters Patent is hereby corrected as shown below:

Column 32,
Line 10, replace "he" with -- the --
Line 12, replace "dust" with -- just --

Column 42,
Line 66, replace "receiving a signal representing communication with the" to
-- receiving a signal from the --

Signed and Sealed this

Twenty-third Day of September, 2003

JAMES E. ROGAN
*Director of the United States Patent and Trademark Office*